US008874631B2

(12) United States Patent
Matsumoto et al.

(10) Patent No.: US 8,874,631 B2
(45) Date of Patent: Oct. 28, 2014

(54) RANDOM NUMBER GENERATION APPARATUS

(75) Inventors: Mari Matsumoto, Yokohama (JP); Tetsufumi Tanamoto, Kawasaki (JP); Shinichi Yasuda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1291 days.

(21) Appl. No.: 12/504,998

(22) Filed: Jul. 17, 2009

(65) Prior Publication Data

US 2010/0057820 A1  Mar. 4, 2010

(30) Foreign Application Priority Data

Aug. 26, 2008  (JP) ................................. 2008-217143

(51) Int. Cl.
*G06F 1/02* (2006.01)
*G06F 7/58* (2006.01)
*H03B 5/08* (2006.01)

(52) U.S. Cl.
CPC ...................................... *G06F 7/588* (2013.01)
USPC ............ 708/250; 708/254; 708/255; 331/167

(58) Field of Classification Search
CPC ........... G06F 7/58; G06F 7/582; G06F 7/584; G06F 7/586; G06F 7/588
USPC ............... 708/250, 254–255; 331/167; 707/1; 718/1
See application file for complete search history.

(56) References Cited

U.S. PATENT DOCUMENTS

| | | | | |
|---|---|---|---|---|
| 5,317,528 A * | 5/1994 | Gofman | ......................... | 708/250 |
| 5,909,520 A * | 6/1999 | Garcia | .......................... | 382/303 |
| 7,206,797 B2 * | 4/2007 | Gressel et al. | ................. | 708/250 |
| 7,224,209 B2 * | 5/2007 | Hsu | ................................ | 327/538 |
| 7,495,416 B2 * | 2/2009 | Sato et al. | ...................... | 320/134 |
| 7,509,639 B2 * | 3/2009 | Worley, Jr. | ......................... | 718/1 |
| 7,647,366 B2 * | 1/2010 | Meintrup et al. | .............. | 708/250 |
| 7,702,704 B2 * | 4/2010 | Muranaka | ...................... | 708/250 |
| 2003/0018608 A1 * | 1/2003 | Rice et al. | .......................... | 707/1 |
| 2003/0061250 A1 * | 3/2003 | Fujita et al. | ..................... | 708/250 |
| 2005/0050123 A1 * | 3/2005 | Liardet et al. | ................. | 708/250 |
| 2005/0125471 A1 | 6/2005 | Sturm et al. | | |
| 2005/0180219 A1 * | 8/2005 | Ohba et al. | ............... | 365/185.28 |

(Continued)

OTHER PUBLICATIONS

U.S. Appl. No. 12/391,640, filed Feb. 24, 2009, Shigeki Kobayashi, et al.

(Continued)

*Primary Examiner* — Farley Abad
*Assistant Examiner* — Henry Yu
(74) *Attorney, Agent, or Firm* — Oblon, Spivak, McClelland, Maier & Neustadt, L.L.P.

(57) ABSTRACT

A random number generation apparatus includes: a random noise generation element comprising a source region and a drain region, a tunnel insulation film, a gate electrode, and a charge trap portion provided between the tunnel insulation film and the gate electrode and being capable of trapping charges, random noise being generated in a drain current flowing between the source region and the drain region on the basis of charges trapped in the charge trap portion; a random number conversion circuit for converting random noise generated from the random noise generation element to a random number; a first test circuit for performing a random number test to test quality of the random number output from the random number conversion circuit; and an initialization circuit for pulling out charges in the charge trap portion of the random noise generation element to the semiconductor substrate through the tunnel insulation film and thereby initializing the charge trap portion.

18 Claims, 26 Drawing Sheets

(56) References Cited

U.S. PATENT DOCUMENTS

| | | |
|---|---|---|
| 2005/0204220 A1 | 9/2005 | Yasuda et al. |
| 2007/0162806 A1 | 7/2007 | Matsumoto et al. |
| 2007/0276890 A1 | 11/2007 | Franke et al. |
| 2007/0296025 A1 | 12/2007 | Matsumoto et al. |
| 2009/0002085 A1* | 1/2009 | Tarng et al. .................. 331/167 |
| 2010/0030958 A1* | 2/2010 | Guyot et al. .................. 711/112 |

OTHER PUBLICATIONS

U.S. Appl. No. 12/130,567, filed May 30, 2008, Mari Matsumoto, et al.

* cited by examiner

RANDOM NUMBER GENERATION APPARATUS

CROSS-REFERENCE TO RELATED APPLICATION

This application is based upon and claims the benefit of priority from prior Japanese Patent Application No. 2008-217143 filed on Aug. 26, 2008 in Japan, the entire contents of which are incorporated herein by reference.

BACKGROUND

1. Technical Field

Described herein is a random number generation apparatus.

2. Related Art

Conventionally, a random number generation apparatus using a physical random number generation source is known. As its representative random number source, a thermal noise, a quantum effect, or charge traps can be mentioned. As for charge traps, there are various forms such as charge traps naturally formed by lattice defects, impurities or the like, and charge traps artificially formed by quantum dots or the like. Furthermore, the charge traps can be applied to the case where natural decrease of charges from a NAND type flash memory is utilized. The charge traps tend to be more remarkable as an element becomes finer.

On the other hand, an arithmetic random number generated by a definite algorithm has been conventionally used as a random number of a random number generation apparatus mounted on a small-sized portable terminal such as an IC card. As a high security level is demanded, its criterion becomes severe from year to year and a random number having a higher degree of genuineness is demanded.

In addition, it is becoming an indispensable condition to periodically check a quality of the random number generated by the mounted random number generation apparatus. For example, in AIS (Application notes Interpretation of the Scheme) 31 presented by Schindler et al., the on-line test, start-up test and the like are imposed on a random noise generation element.

On the other hand, a self-test type random number generation apparatus incorporating a test circuit which periodically checks the quality of the random number is known (see, for example, U.S. Patent Application Publication No. 2005/0123471). In the random number generation apparatus described in U.S. Patent Application Publication No. 2005/0123471, a random noise generation element utilizing the traps is used, a monobit test is adopted as the test method, and a random noise generation element which has produced a better result satisfying a criterion is selected out and used for random number generation.

Furthermore, a random number generation apparatus described in U.S. Patent Application Publication No. 2007/0276890 utilizes the fact that time for discharging charge stored in traps in a random noise generation element becomes random and adopts a method of assigning "1" or "0" according to whether the time taken to emit charge is longer or shorter than some reference time.

In the random noise generation element utilizing the traps, however, the charge stored in the traps tends to remain stored as described later. Even if a fixed reference value is set, the average value of the charge emission time also changes according to the number of times of use and the frequency of use. Thus, there is a possibility that it will become impossible to generate a random number of high quality having unpredictability and nonreproducibility as a physical random number.

SUMMARY

Possible embodiments of this invention are made in view of these circumstances, and some embodiments of this invention may provide a random number generation apparatus capable of generating a random number of high quality having unpredictability and nonreproducibility as a physical random number regardless of the number of times of use and the frequency of use even if a random noise generation element utilizing the traps is used.

A random number generation apparatus according to a first aspect of the present invention includes: a voltage supply circuit configured to supply a voltage; a random noise generation element comprising a source region and a drain region formed at a distance between on a semiconductor substrate, a tunnel insulation film formed on the semiconductor substrate to serve as a channel region between the source region and the drain region, a gate electrode formed above the tunnel insulation film and supplied with the voltage from the voltage supply circuit, and a charge trap portion provided between the tunnel insulation film and the gate electrode, the charge trap portion being capable of trapping charges, and random noise being generated in a drain current flowing between the source region and the drain region on the basis of charges trapped in the charge trap portion; a random number conversion circuit configured to convert random noise generated from the random noise generation element to a random number and outputs the random number; a first test circuit configured to perform a random number test to test quality of the random number output from the random number conversion circuit; and an initialization circuit configured to pull out charges in the charge trap portion of the random noise generation element to the semiconductor substrate through the tunnel insulation film and thereby initialize the charge trap portion.

A random number generation apparatus according to a second aspect of the present invention includes: a voltage supply circuit configured to supply a voltage; a random noise generation element comprising a source region and a drain region formed at a distance between on a semiconductor substrate, a tunnel insulation film formed on the semiconductor substrate to serve as a channel region between the source region and the drain region, a gate electrode formed above the tunnel insulation film and supplied with the voltage from the voltage supply circuit, and a charge trap portion provided between the tunnel insulation film and the gate electrode, the charge trap portion being capable of trapping charges, and random noise being generated in a drain current flowing between the source region and the drain region on the basis of charges trapped in the charge trap portion; a random number conversion circuit configured to convert random noise generated from the random noise generation element to a random number and outputs the random number; a first test circuit configured to perform a random number test to test quality of the random number output from the random number conversion circuit; a drain current monitor circuit configured to monitor the drain current of the random noise generation element and make a decision whether the drain current has stabilized; and an output circuit configured to output the random number output from the random number conversion circuit to outside when the drain current monitor circuit judges the drain current to have stabilized and the first test circuit judges the random number to be success.

DETAILED DESCRIPTION

Figure 1:
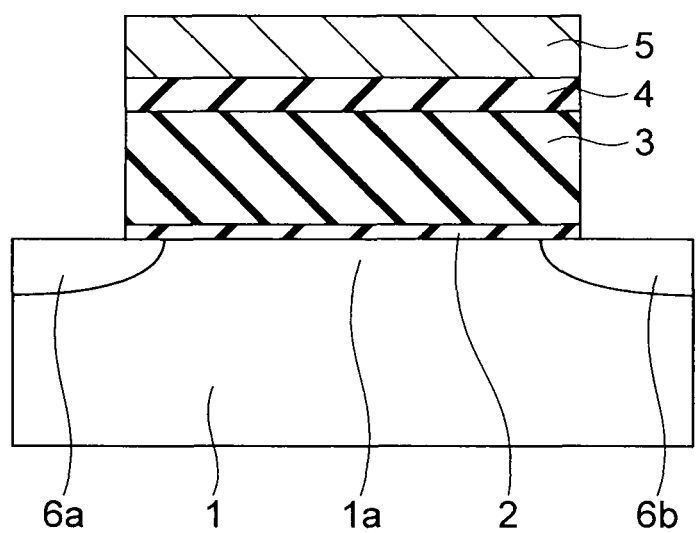
FIG. 1 is a sectional view showing a concrete example of a random noise generation element.

Before describing embodiments, the course of events for achieving the present invention will be described below.

First, the necessity of initialization of the random noise generation element will be described. As an example of a random noise generation element using charge traps as a noise generation source, a MOSFET having a non-stoichiometric SiN film as a trap film and utilizing dangling bonds in the SiN film can be mentioned (see, for example, JP-A 2007-304730 (KOKAI)). By the way, in an embodiment of the present invention, not only a MOSFET utilizing dangling bonds in the SiN film but also an ordinary MOSFET utilizing an RTS (Random telegraph signal) or a memory element such as a NAND flash memory utilizing a leak of charge from a memory as a random number can be used.

In a random noise generation element 10 used in an embodiment of the present invention, for example, a MOSFET described in JP-A 2007-304730 (KOKAI), a tunnel insulation film 2 is formed on a channel region 1a of a semiconductor substrate 1 and a trap insulation film 3 is formed on the tunnel insulation film 2. An insulation part is formed of the tunnel insulation film 2 and the trap insulation film 3. The trap insulation film 3 includes traps based upon dangling bonds, and it is represented by a general expression $Si_x(SiO_2)_y(Si_3N_4)_{1-y}M_x$ (where M is an element other than Si, O and N, $x \geq 0$, $1 \geq y \geq 0$, $z \geq 0$ (except the case where x=0, y=1 and z=0)). For example, the trap insulation film 3 is formed of a non-stoichiometric silicon oxide nitride film. A control oxide film (control insulation film) 4 is formed on the trap insulation film 3, and a gate electrode (control electrode) 5 formed of $n^+$ type polysilicon is formed on the control oxide film 4.

Thus, in the random noise generation element 10 in an embodiment, only a very thin tunnel insulation film 2 exists between the channel region 1a and the tunnel insulation film 3 having traps based on dangling bonds. Therefore, random charge and discharge of electrons (charge) caused by thermal fluctuation occur between the channel region 1a and the trap insulation film 3 via the tunnel insulation film 2. Therefore, conductivity of the channel region 1a varies randomly according to the quantity of charge trapped by traps in the trap insulation film 3. In other words, a current flowing between a source region 6a and a drain region 6b varies according to the quantity of the charge trapped by the traps varies randomly. Therefore, it is possible to generate a physical random number based upon the random variation of the conductivity of the channel region 1a.

Figure 2:
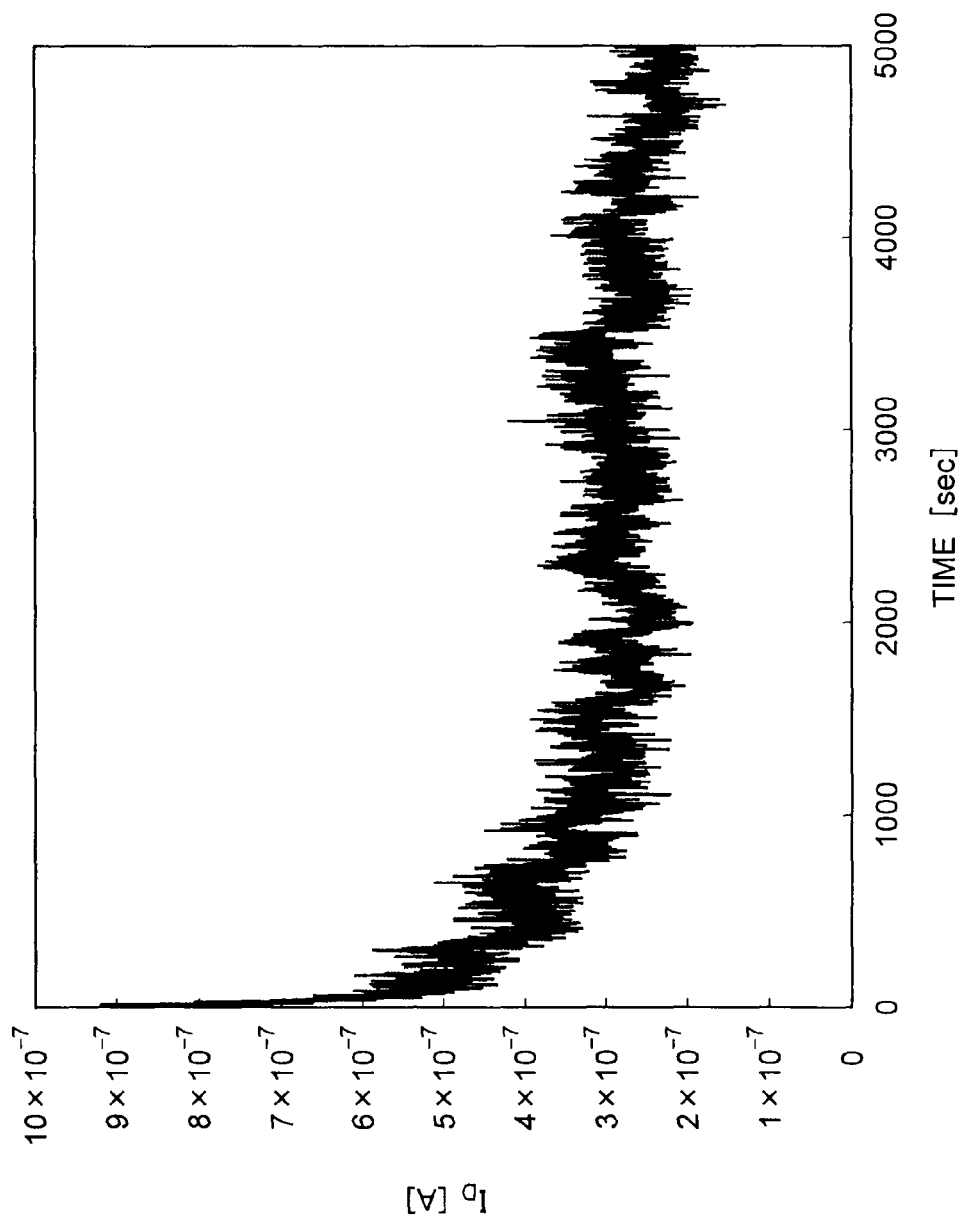
FIG. 2 is a diagram showing a change of a drain current of a random noise generation element shown in FIG. 1 with time.

Results obtained by measuring the change of the drain current with time when a voltage is applied to the gate electrode in the random noise generation element 10 for a long time are shown in FIG. 2. As appreciated from FIG. 2, the average current value per unit time decreases with time although the drain current repeats random increase and decrease at high speed. The present inventors considered as to the cause of the phenomenon as follows. Charging and discharging of charges are conducted between the channel region 1a and the trap insulation film 3 by continuing to apply a voltage for a long time. Partial charges are stored in the traps as they are. Regions into which carrier electrons cannot intrude because of the Coulomb screening effect caused by the trapped charge gradually increase. As a result, the channel becomes high in resistance while leaving a random change. That is considered to be the cause of the above-described phenomenon.

It is not a phenomenon which causes only in the random noise generation element described in JP-A 2007-304730 (KOKAI), but it is a phenomenon which might cause in any random noise generation element in the case where random noise is generated utilizing some charge traps as described, for example, in JP-A 2005-167165 (KOKAI). A random noise generation element described in JP-A 2005-167165 (KOKAI) is a MOSFET using a Si nano-crystal particle group as charge traps. Only a very thin tunnel insulation film lies between the channel and the Si nano-crystal particle group. Random charging and discharging of electrons caused by thermal fluctuation occur between the channel and the Si nano-crystal particle group serving as the traps. Therefore, the conductivity of the channel region varies randomly according to the quantity of charge trapped by the Si nano-crystal particle group. As a result, the current flowing through the channel varies randomly, and random noise is generated. It is possible to generate a random number by converting the random noise to a digital random number by using a random number conversion circuit. The random noise generation element described in JP-A 2005-167165 (KOKAI) can also be used as the random noise generation element in the random number generation apparatus according to an embodiment of the present invention.

The random number conversion circuit means a circuit which converts a random noise signal to a digital random number by using some method. For example, the output digital random number is determined to be "1" or "0" according to whether the input current value (or voltage value) is larger than a certain reference current value (or voltage value). (The reference at this time is generally the average value of the current or voltage.) As described above, the random noise generation element has characteristics that the average current through the drain deviates with elapse of time. Therefore, there is a possibility that the random current value (or voltage value) input to the random number conversion circuit will become on the whole less than or more than the reference value and the total number of "1" and the total number of "0" in the random number output from the random number conversion circuit will not be balanced.

Thus, the present inventors have considered that it is a random number generation apparatus capable of generating a high quality random number having a quality which is not affected by a change with time and having unpredictability and nonreproducibility as a physical random number by causing charge stored in the charge traps in the random noise generation element to be emitted periodically and restoring the trap film in the random noise generation element to its initial state. In other words, the random number generation apparatus according to an embodiment is configured so as to include an initialization circuit for restoring the random noise generation element using the charge traps as a noise generation source to the initial state.

(First Embodiment)

Figure 3:
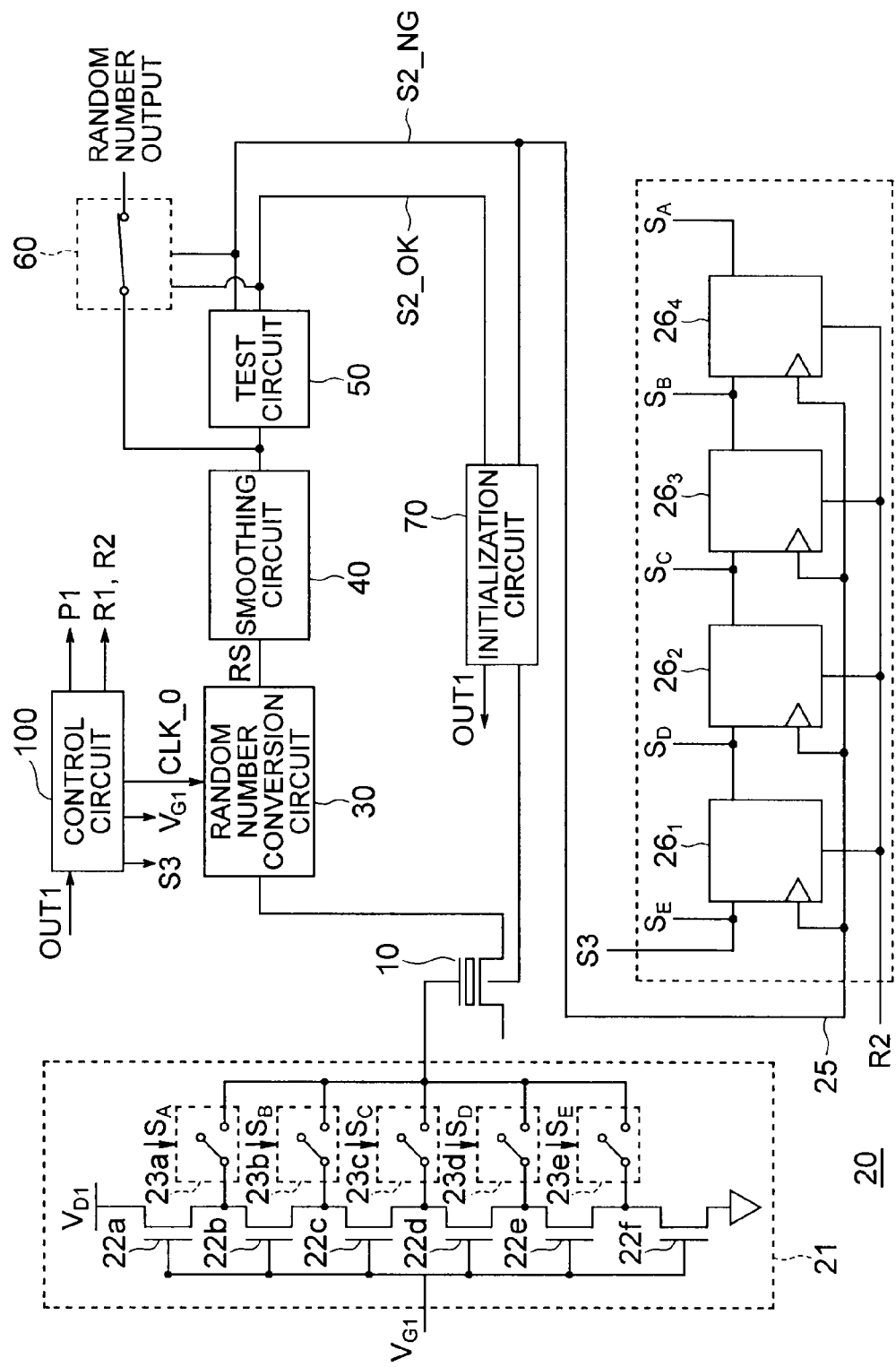
FIG. 3 is a block diagram showing a random number generation apparatus according to a first embodiment.

A random number generation apparatus according to a first embodiment is shown in FIG. 3. The random number generation apparatus according to the present embodiment includes a random noise generation element 10, an optimum voltage adjustment circuit 20, a random number conversion circuit 30, a smoothing circuit 40, a test circuit 50, an output circuit 60, an initialization circuit 70 and a control circuit 100. The random noise generation element 10 is, for example, the MOSFET shown in FIG. 1.

The optimum voltage adjustment circuit 20 is a circuit which adjusts a gate voltage suitable for the random noise generation element 10 to generate random noise (a physical random number). The optimum voltage adjustment circuit 20 includes a gate voltage supply circuit 21 and a changeover signal generation circuit 25 which generates changeover signals $S_A$, $S_B$, $S_C$, $S_D$ and $S_E$ for changing over the gate voltage.

The gate voltage supply circuit 21 includes a serial circuit formed of, for example, six n-channel MOS transistors 22a, 22b, 22c, 22d, 22e and 22f which are connected in series and which receive a gate signal $V_{G1}$ from the control circuit 100 at their gates, and five switches 23a, 23b, 23c, 23d and 23e. A first end of the serial circuit is connected at its first end to a power supply voltage $V_{D1}$ and connected at its second end to the ground. The switch 23a operates on the basis of the changeover signal $S_A$. A first end of the switch 23a is connected to a common connection node of the MOS transistor 22a and the MOS transistor 22b, and a second end of the switch 23a is connected to the gate of the random noise generation element 10. The switch 23b operates on the basis of the changeover signal $S_B$. A first end of the switch 23b is connected to a common connection node of the MOS transistor 22b and the MOS transistor 22c, and a second end of the switch 23b is connected to the gate of the random noise generation element 10. The switch 23c operates on the basis of the changeover signal $S_C$. A first end of the switch 23c is connected to a common connection node of the MOS transistor 22c and the MOS transistor 22d, and a second end of the switch 23c is connected to the gate of the random noise generation element 10. The switch 23d operates on the basis of the changeover signal $S_D$. A first end of the switch 23d is connected to a common connection node of the MOS transistor 22d and the MOS transistor 22e, and a second end of the switch 23d is connected to the gate of the random noise generation element 10. The switch 23e operates on the basis of the changeover signal $S_E$. A first end of the switch 23e is connected to a common connection node of the MOS transistor 22e and the MOS transistor 22f, and a second end of the switch 23e is connected to the gate of the random noise generation element 10. In other words, the gate voltage supply circuit 21 selects one out of five voltages obtained by dividing the power supply voltage $V_{D1}$ by means of on-resistances of the six MOS transistors 22a, 22b, 22c, 22d, 22e and 22f, on the basis of the changeover signals $S_A$, $S_B$, $S_C$, $S_D$ and $S_E$, and applies the selected voltage to the gate of the random noise generation element 10.

The changeover signal generation circuit 25 is a shift register having four shift stages formed by four D flip-flops $26_1$ to $26_4$ which operate on the basis of a signal S2_NG output from the test circuit 50 to indicate failure in the test. An input signal of the flip-flop $26_1$ in the first shift stage (an on-signal S3 from the control circuit 100) is the changeover signal $S_E$. An output signal of the flip-flop $26_1$ in the first shift stage is the changeover signal $S_D$. An output signal of the flip-flop $26_2$ in the second shift stage is the changeover signal $S_C$. An output signal of the flip-flop $26_3$ in the third shift stage is the changeover signal $S_B$. An output signal of the flip-flop $26_4$ in the fourth shift stage is the changeover signal $S_A$. In other words, the on-signal S3 sent from the control circuit 100 is successively shifted every time the signal S2_NG is sent from the test circuit 50, and a changeover signal is generated from a stage to which the on-signal S3 is shifted. The shift register 25 is reset by a reset signal R2 sent from the control circuit 100. By the way, the number of stages in the shift register 25 and the number of the switches 23a, 23b, 23c, 23d and 23e in the gate voltage supply circuit 21 are changed according to the width and the number of steps in adjusting the voltage applied to the gate of the random noise generation element 10.

The random number conversion circuit 30 samples a physical random number (for example, the drain current value) generated by the random noise generation element 10, at timing of a rising edge or a falling edge of a clock signal CLK_1 sent from the control circuit 100, and outputs a digital random signal RS which becomes "0" or "1" in value according to its sample value.

Random noise generated by the random noise generation element 10 used in the present embodiment has 1/f characteristics (where f is a frequency of fluctuation). In the present embodiment, therefore, the smoothing circuit 40 is provided to generate a random number which does not have a periodicity caused by the 1/f characteristics. In other words, the smoothing circuit 40 outputs a digital random signal obtained by removing the periodicity caused by 1/f characteristics from the digital random signal output from the random number conversion circuit 30. The smoothing circuit 40 may be incorporated into the random number conversion circuit 30. If a random noise generation element which does not have 1/f characteristics in the generated random noise is used, then the smoothing circuit becomes unnecessary.

Figure 4:
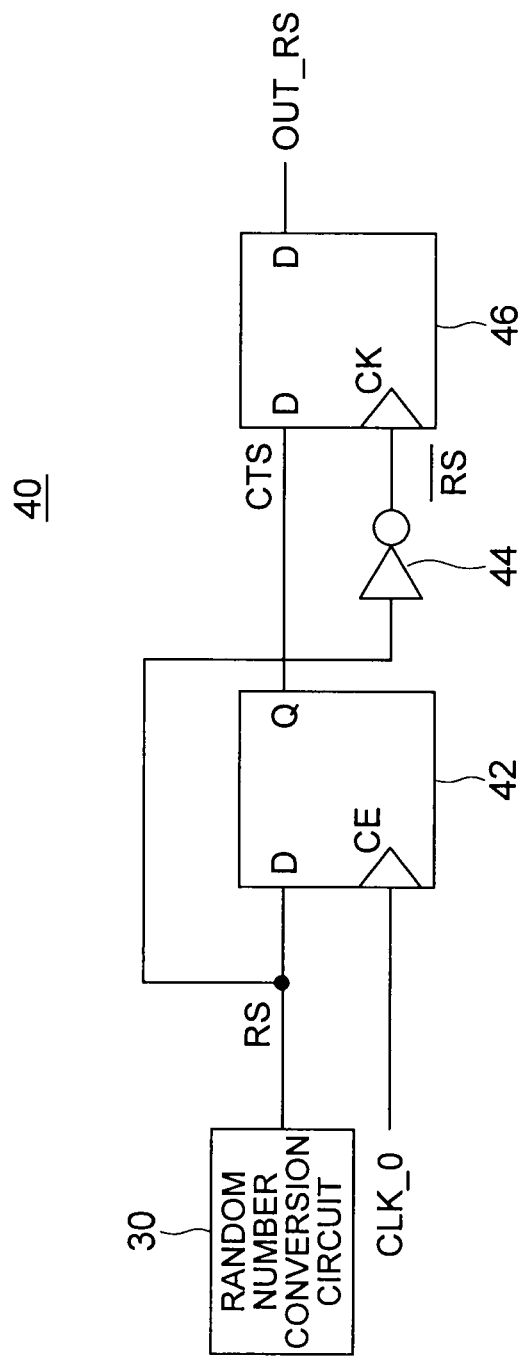
FIG. 4 is a circuit diagram showing a concrete example of a smoothing circuit used in the first embodiment.

A concrete example of the smoothing circuit 40 is shown in FIG. 4. The smoothing circuit 40 in this concrete example includes a counter circuit 42 formed of a flip-flop, an inverter 44, and a latch circuit 46 formed of a flip-flop. The counter circuit 42 counts pulses of a reference clock signal CLK_0 sent from the control circuit 100 and input to a clock enable terminal CE in accordance with a change of the digital random signal R sent from the random number conversion circuit 30 and input to a D terminal, and outputs its count value CTS. The latch circuit 46 receives a digital random signal/RS obtained by inverting the digital random signal RS in the inverter 44 at a clock input terminal CK, latches the output CTS of the counter circuit 42 in accordance with a change of the digital random signal RS, and outputs a value OUT_RS thus latched.

Figure 5:
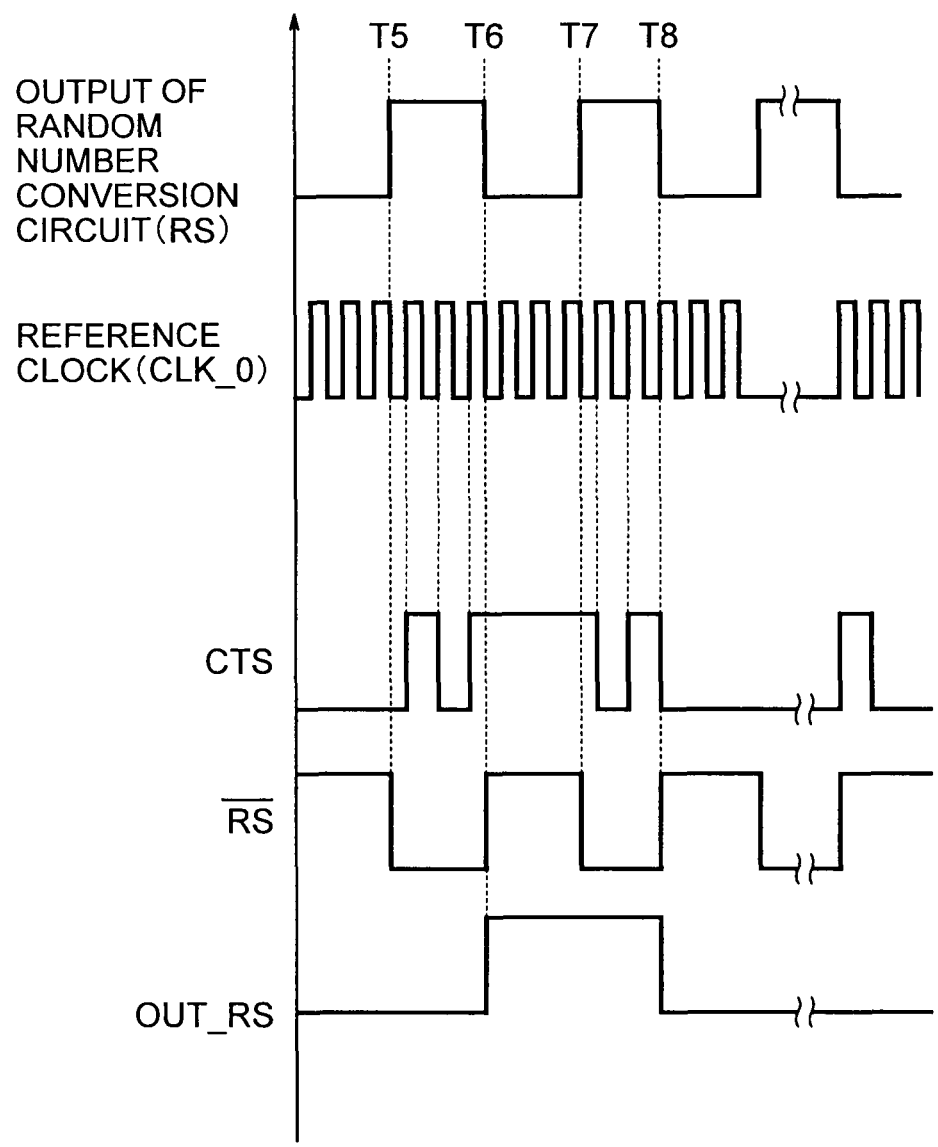
FIG. 5 is a waveform diagram for explaining operation of the smoothing circuit shown in FIG. 4.

FIG. 5 is a waveform diagram for explaining operation of the smoothing circuit 40 shown in FIG. 4. First, the random signal RS which is the output of the random number conversion circuit 30 change from a low level to a high level at time T5. When the random signal RS assumes the high level between the time T5 and time T6, the counter circuit 42 outputs the count signal CTS from its output terminal Q. The count signal CTS assumes its high level and its low level alternately every time the rising edge of the clock signal CLK_0 is detected. Here, it is supposed that the counter circuit 42 is, for example, a 1-bit counter which assumes the low level and the high level alternately every count. If the random signal RS changes from the high level to the low level at the time T6, then the inverter 44 outputs the random signal/RS which becomes the high level. Since the random signal/RS becomes the high level, the latch circuit 46 latches the count signal CTS which is output from the counter circuit 42, and outputs the random number signal OUT_RS. At time T7, the random signal RS changes from the low level to the high level again. Thereupon, the counter circuit 42 changes over the level of the count signal CTS alternately every time the rising edge of the clock signal CLK_0 is detected while the random signal RS assumes the high level. At time T8, the random signal changes from the high level to the low level. Since the random signal RS becomes the low level, the inverter 44 outputs the random signal/RS which becomes the high level. Since the random signal/RS becomes the high level, the latch circuit 46 latches the count signal CTS which is output from the counter circuit 42, and outputs the random number signal OUT_RS. Thereafter, operation of outputting the random number signal OUT_RS at a falling edge of the random signal RS in the same way is repeated.

Use of the smoothing circuit 40 in the present concrete example shown in FIG. 4 brings about an effect that inclination is eliminated in the appearance frequency of "0" and "1" and the 1/f characteristics the random noise generation element 10 has are canceled as the frequency of the clock signal CLK_0 becomes higher. When generating a random number, however, it is necessary to select the frequency of the clock signal CLK_0 by taking characteristics of the random number in use into consideration.

The random number the 1/f characteristics have thus been canceled by the smoothing circuit 40 is sent to the test circuit 50. In the test circuit 50, a test is conducted to determine whether the random number output from the smoothing circuit is a high quality random number having unpredictability and nonreproducibility.

Figure 6:
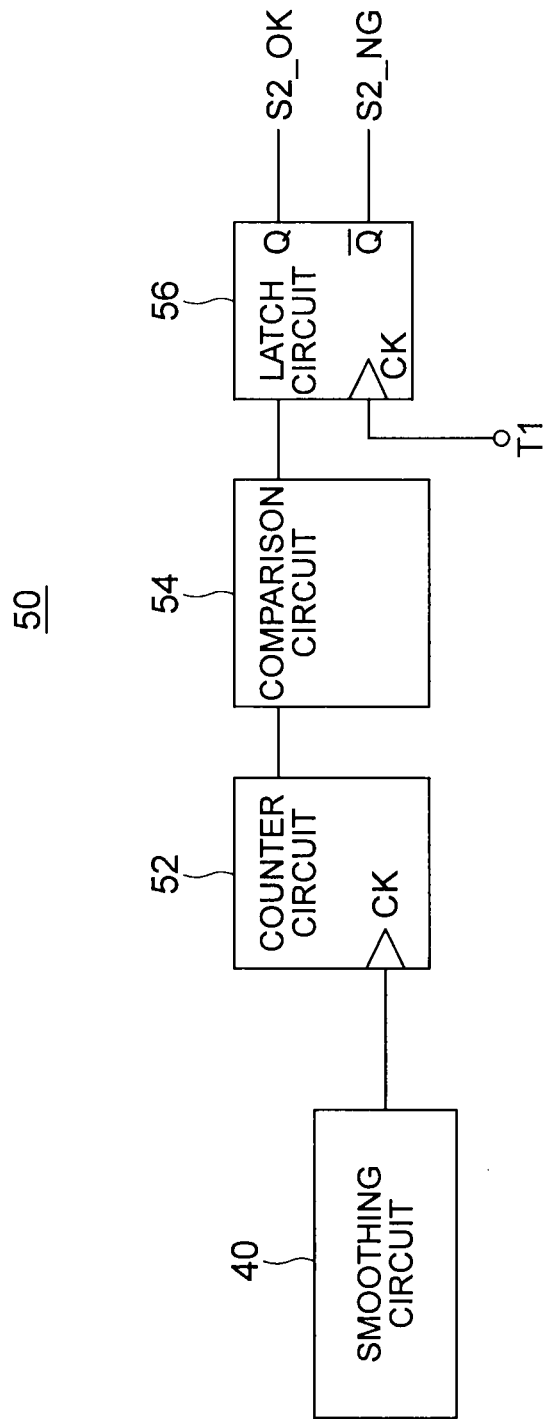
FIG. 6 is a circuit diagram showing a concrete example of a test circuit used in the first embodiment.
Figure 7:
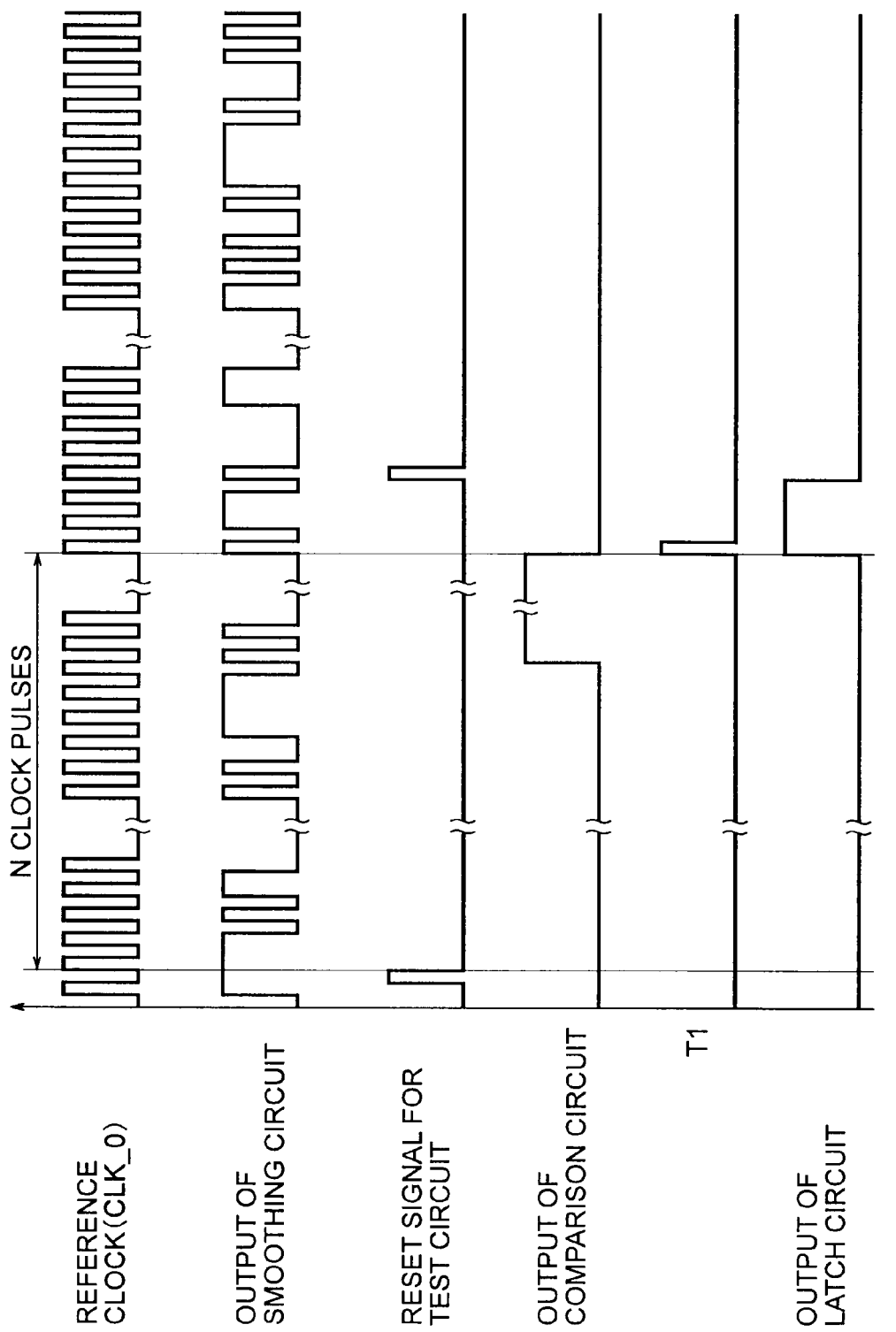
FIG. 7 is a waveform diagram for explaining operation of the test circuit shown in FIG. 6.

A concrete example of the test circuit 50 according to the present embodiment is shown in FIG. 6, and a timing chart of operation of the test circuit is shown in FIG. 7. The test circuit 50 in the concrete example includes a counter circuit 52 formed of a flip-flop, a comparison circuit 54, and a latch circuit 56 formed of a flip-flop. The test circuit in the concrete example is based upon the monobit test, and the test circuit counts the number of values of "1" in the digital random number which is output from the smoothing circuit 40. The counter circuit 52 counts the number of "1s" in the digital random number which is output from the smoothing circuit 40, and the comparison circuit 54 compares the counted value with predetermined reference values. If the value obtained by the counting in the counter circuit 52 is in the range between the reference values, then the comparison circuit 54 outputs data "1" between pulses of the clock without fail since the counter circuit 52 is reset until it is reset the next time. It is supposed that the determined total number of random numbers used in the test is N. The latch circuit 56 latches a value which is output from the comparison circuit 54 according to a signal T1 which rises at the Nth pulse of the clock from the test start. A result of the test in the test circuit 50 is "success" if a signal output from an output terminal Q of the latch circuit 56 and latched by the signal T1 is "1", whereas the result of the test is "failure" if the signal is "0." In other words, when the test result is success, the signal output from the output terminal Q of the latch circuit 56 becomes "1." When the test result is failure, the signal output from an output terminal/Q of the latch circuit 56 becomes "1." Respective outputs are referred to as signals S2_OK and S2_NG. Therefore, the signal S2_OK becomes a test success signal, and the signal S2_NG becomes a test failure signal.

In an alternative configuration for the test circuit 50 shown in FIG. 6, an inverter is provided between the smoothing circuit 40 and the counter circuit 52 to invert the output of the smoothing circuit 40 and an output of the inverter is input to the clock terminal CK of the counter circuit 52. In the circuit configuration, "0" outputs of the smoothing circuit 40 are counted.

According to a criterion in the monobit test contained in items of the FIPS (Federal Information Processing Standard) 140-2 formed of four random number data test items created by the National Institute of Standards and Technology (NIST), a test is conducted on a random number having a total number of 20,000 bits and a test success condition is that the number of "1s" or "0s" is in the range of 9654 to 10346.

The switch 60 shown in FIG. 3 turns off to prevent the digital random number which is output from the smoothing circuit 40 from being output to the outside, when the signal S2_NG is output from the test circuit 50 to mean that the test result is failure. The switch 60 turns on to allow the digital random number which is output from the smoothing circuit 40 to be output to the outside, when the signal S2_OK is output from the test circuit 50 to mean that the test result is success.

The initialization circuit 70 according to the present embodiment will now be described.

In general, the following three conditions can be mentioned as operation conditions of the initialization circuit:

(1) Initialization is carried out when the random number generation apparatus is started;

(2) Initialization is carried out when the quality of the random number has degraded; and (3) Initialization is carried out according to the used time and the number of times of use.

It is possible to obtain an effect of an embodiment of the present invention by including at least one of the above-described three conditions.

Figure 8:
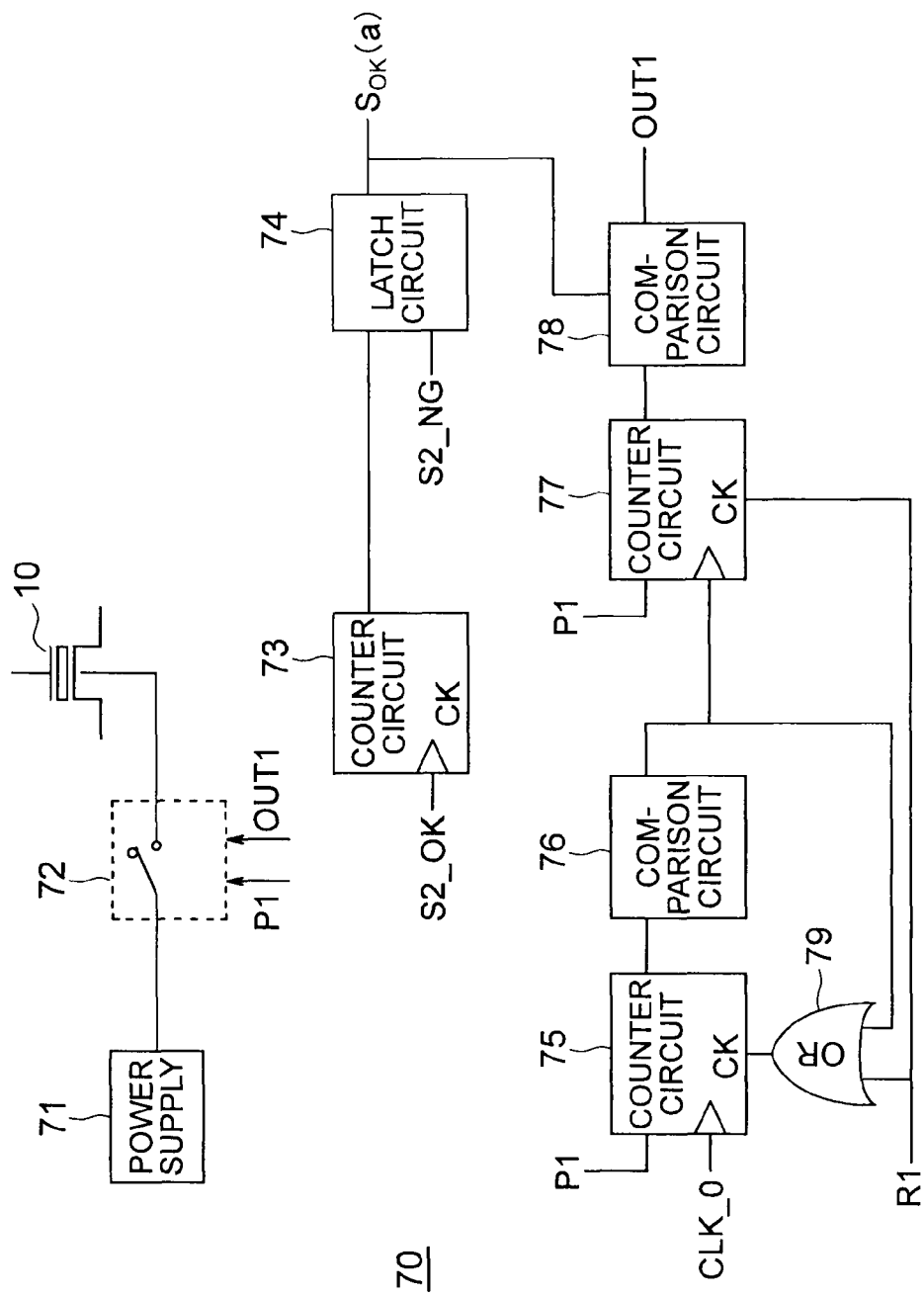
FIG. 8 is a circuit diagram showing a concrete example of an initialization circuit used in the first embodiment.
Figure 9:
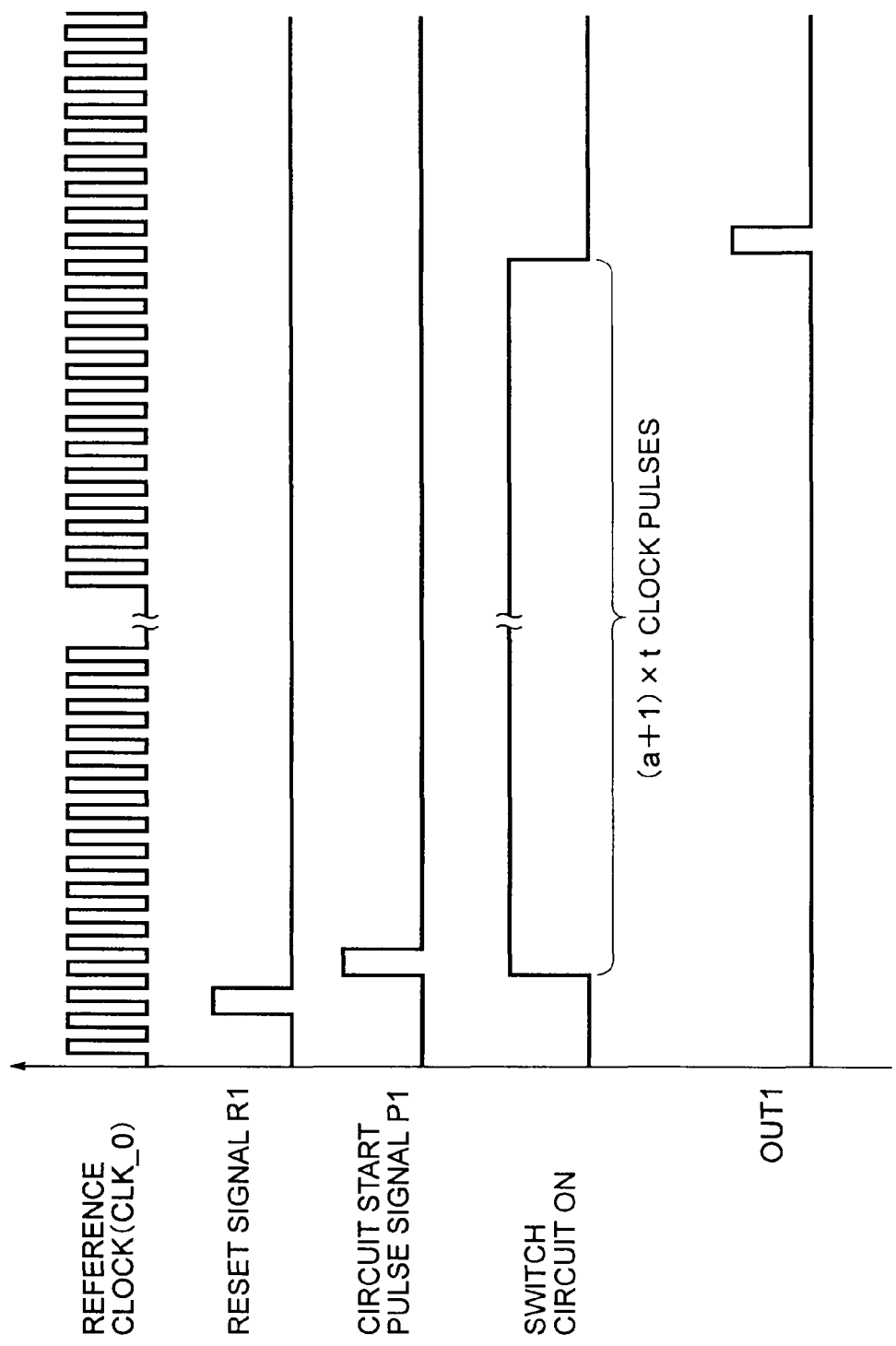
FIG. 9 is a waveform diagram for explaining operation of the initialization circuit shown in FIG. 8.

A concrete example of the initialization circuit 70 according to the present embodiment is shown in FIG. 8, and a waveform diagram for explaining its operation is shown in FIG. 9. The initialization circuit 70 in this concrete example includes a power supply 71, a switch circuit 72, a counter circuit 73, a latch circuit 74, counter circuits 75 and 77, comparison circuits 76 and 78, and an OR circuit 79.

When the circuit is started, when the test circuit 50 has produced a result of failure, when a specific time is reached, and when a specific number of times of use is reached, the initialization circuit 70 resets the counter circuits 75 and 77 by a reset signal R1 sent from the control circuit 100 and turns on a VDD signal of the counter circuits 75 and 77 by a circuit start pulse signal P1 sent from the control circuit 100. After the reset signal RI has turned on, the initialization circuit 70 turns on the switch circuit 72 by the circuit start pulse signal P1 and applies a voltage of the power supply 71 to the substrate of the random noise generation element 10. As for the voltage application time, t pulses of the reference clock CLK_0 is regarded as one set. At the time of refresh when the circuit is started, the voltage is applied to the substrate of the random noise generation element 10 over a time period corresponding to (t×1) clock pulses. The unit time t clock pulses over which the voltage is applied to the substrate may be determined arbitrarily. Even if the time period corresponding to (t×1) clock pulses is approximately several seconds, however, the effect of sufficiently pulling out the charge stored in the trap insulation film of the random noise generation element 10 can be expected. In addition, application time corresponding to t clock pulses is added to the refresh time t for each success in the test. For example, if success is obtained "a" times and followed by a failure in the random number test conducted by the test circuit 50, then the voltage is applied over a time period corresponding to ((a+1)×t) clock pulses.

The test success signal S2_OK from the test circuit 50 is input to a clock input terminal of the counter 73. The counter 73 counts the number of times of success judged by the test circuit 50. The latch circuit 74 records the number at timing of a rising edge of the test failure signal S2_NG. In addition, the reference clock signal CLK_0 is input to a clock input terminal CK of the counter circuit 75, and the counter circuit 75 counts the number of clock pulses.

This count value is sent to the comparison circuit 76 and compared with the reference value t clock pulses. When the count value has become equal to t (clock pulses) which is the reference value, the comparison circuit 76 outputs a signal having a value "1". This signal is input to the OR circuit 79, and the count value in the counter circuit 75 is reset by an output of the OR circuit 79. The reset signal RI is also input to the OR circuit 79.

The output of the comparison circuit 76 is input to a clock input terminal of the counter circuit 77 and counted. The comparison circuit 78 uses a number (here, (a+1)) obtained by adding 1 to the number of successes $S_{OK}(a)$ in the test circuit 50 output from the latch circuit 74, as a reference value, and compares a count value output from the counter circuit 77 with the reference value. When the count value output from the counter circuit 77 has reached (a+1), the comparison circuit 78 outputs OUT1 having a value of "1" and turns off the switch circuit 72. In other words, the signal OUT1 output from the initialization circuit 70 becomes a signal which indicates that the initialization of the random noise generation element 10 has finished.

The initialization circuit 70 having such a configuration makes it possible to apply the voltage of the power supply 71 to the substrate of the random noise generation element 10 when the circuit is started, when a specific time is reached, and when a specific number of times of use is reached. Thus, it becomes possible to initialize, i.e., refresh the random noise generation element 10.

Figure 10:
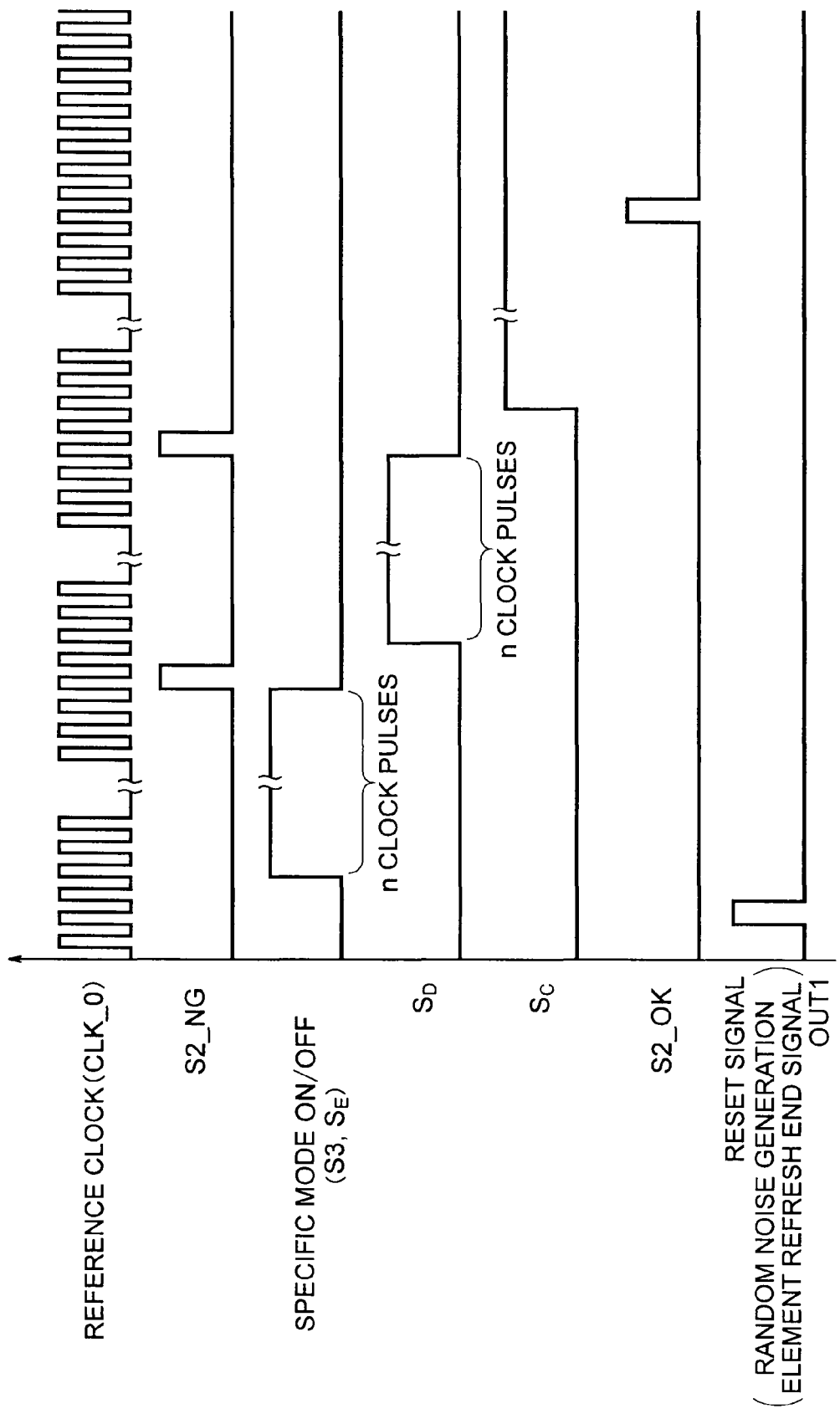
FIG. 10 is a waveform diagram for explaining operation of an optimum voltage adjustment circuit used in the first embodiment.

Operation of the optimum voltage adjustment circuit 20 according to the present embodiment will be described with reference to FIG. 3 and FIG. 10. FIG. 10 is a waveform diagram for explaining the operation of the optimum voltage adjustment circuit 20 according to the present embodiment.

If the signal OUT1 output from the initialization circuit 70 to indicate the end of the initialization of the random noise generation element 10 becomes the on-state, i.e., its value becomes "1", the control signal S3 output from the control circuit 100 becomes "1" and the changeover signal $S_E$ turns on. As a result, the switch 23e turns on, and a potential at a common connection node between the MOS transistor 22e and the MOS transistor 22f is applied to the gate of the random noise generation element 10. A physical random number output from the random noise generation element 10 with the voltage at the common connection node being applied to its gate is converted to the digital random signal RS by the random number conversion circuit 30. The digital random signal output from the random number conversion circuit 30 is smoothed by the smoothing circuit 40, and the smoothed digital random signal is tested by the test circuit 50.

If a result of the test is success, then the switch 60 is turned on by the test success signal S2_OK and the digital random signal output from the smoothing circuit 40 is output to the outside as a random number. If a result of the test is failure, then the switch 60 is turned off by the test failure signal S2_NG and the digital random signal output from the smoothing circuit 40 is not output to the outside as a random number. In other words, if success continues in the random number test conducted by the test circuit 50 periodically, the digital random signal output from the smoothing circuit 40 continues to be output to the outside as a random number.

If the test result is failure, then the test failure signal S2_NG is input to clock terminals of the shift register 25. As a result, the changeover signal shifts from the changeover signal $S_E$ to the changeover signal $S_D$, and the switch 23d turns on whereas other switches turn off. Accordingly, a voltage at the common connection node between the MOS transistor 22d and the MOS transistor 22e is applied to the gate of the random noise generation element 10. A physical random number output from the random noise generation element 10 in this state is converted to the digital random signal by the random number conversion circuit 30. In the same way as the operation conducted when the switch 23e is in the on-state, the digital random signal output from the random number conversion circuit 30 is subject to the random number test in the test circuit 50 via the smoothing circuit 40. If the result is success, then the switch 60 is turned on. If the result is failure, then the test failure signal S2_NG is generated. And the above-described operation is repeated. As a result, the applied voltage adjustment operation in the shift register 25 and the gate voltage supply circuit 21 is continued until the random number passes the test.

Figure 11:
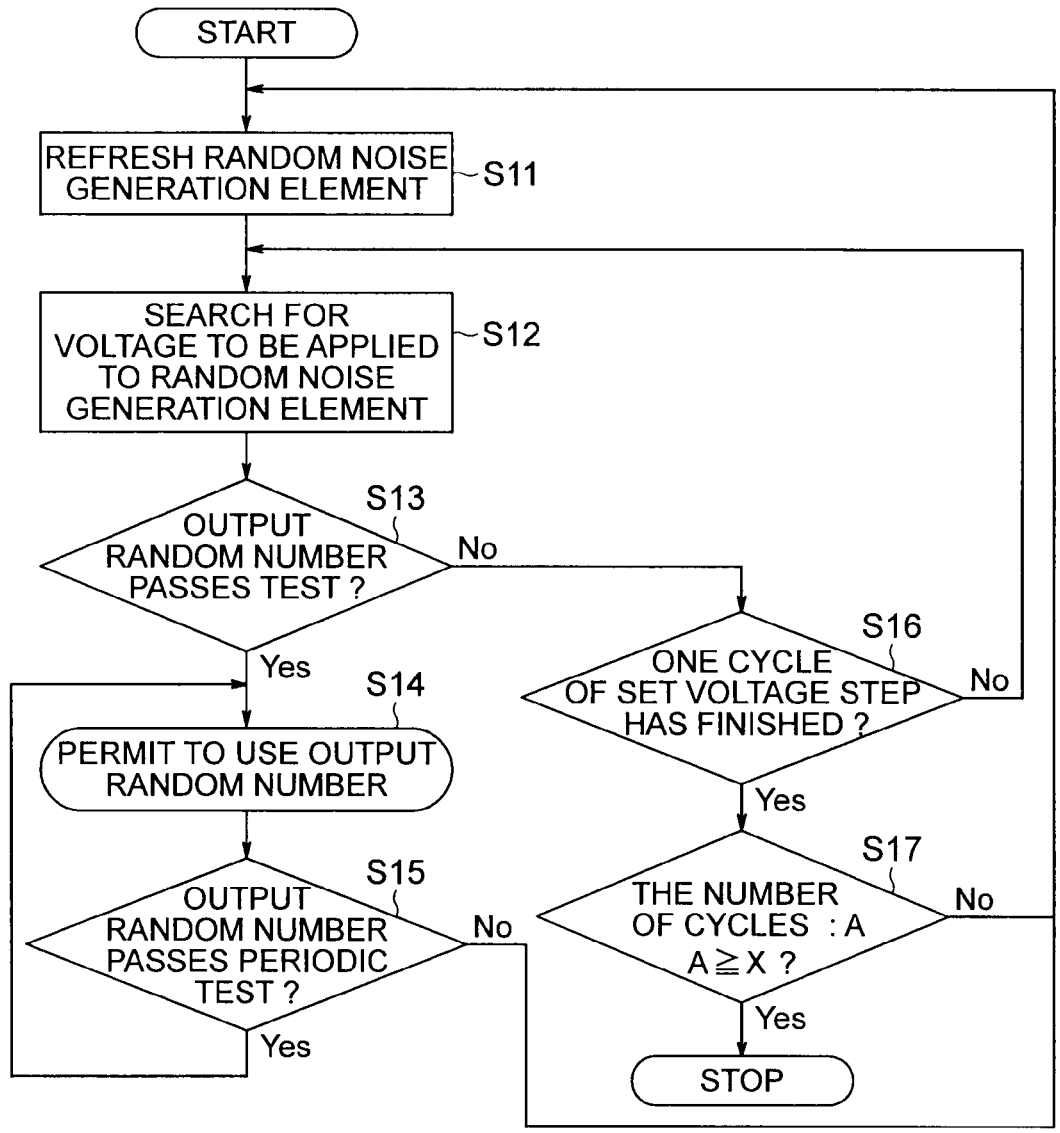
FIG. 11 is a flow chart for explaining operation of the random number generation apparatus according to the first embodiment.

Operation of the random number generation apparatus according to the present embodiment will now be described with reference to FIG. 11. FIG. 11 is a flow chart showing operation of the random number generation apparatus according to the present embodiment.

First, the random number generation apparatus is started, and the random noise generation element 10 is initialized or refreshed (step S11 in FIG. 11) when the circuit is started. In this initialization, the control circuit 100 sends a circuit start pulse signal P1 to the initialization circuit 70 to start the initialization operation and applies a positive voltage to the substrate of the random noise generation element 10. At this time, the optimum voltage adjustment circuit 20 conducts adjustment to obtain a voltage suitable to be applied to the gate of the random noise generation element 10 (step S12). In the present embodiment, the drain voltage is fixed and the drain current in the allowable range is acquired by adjusting the gate voltage. As occasion demands, however, it is also possible to adjust both the drain voltage and the gate voltage.

As for whether the output drain current and drain voltage are in the allowable ranges, the test circuit 50 performs a probability statistical test on the output of the random number conversion circuit 30 obtained via the smoothing circuit 40 and a decision is made according to whether its result is success or failure (step S13). If the result of the test is success, then the gate voltage value applied to the random noise generation element 10 at the present time is judged to be an application condition which satisfies the criterion in random number output and it is permitted to use the output random number as it is and the output random number is output to the outside via the switch 60 (step S14). And the output random number is tested periodically by the test circuit 50 (step S15). If this test brings about a result of success, then the processing returns to the step S14 and the above-described operation is repeated. If the periodic test at the step S15 brings about failure, then the processing returns to the step S11 to refresh the random noise generation element 10 and the above-described operation is repeated.

If the test at the step S13 results in failure, then the processing proceeds to step S16 to make a decision whether one cycle at the set voltage step has finished. Here, one cycle at the set voltage step means that the switches 23e to 23a are turned on one after another and the voltage (set voltage) applied to the gate of the random noise generation element 10 is changed successively with the voltage $V_{G1}$ applied to the optimum voltage adjustment circuit 20 being fixed. In the case of the present embodiment, the set voltage is changed among set voltages of five kinds. Unless one cycle of the set voltage step is finished, the processing returns to the step S12, where the optimum voltage adjustment circuit 20 changes the gate voltage applied to the random noise generation element 10, and a test is conducted with the changed gate voltage again (step S13). If a result of the test performed at the step S13 is success, the processing proceeds to the step S14 and the above-described operation is repeated. If a result of the test conducted at the step S13 is failure, the processing proceeds to the step S16 and the above-described operation is repeated.

If one cycle of the set voltage step is judged at the step S16 to have been finished, then a decision is made at step S17 whether the number of cycles has reached a prescribed value A. If the prescribed value A is judged to have been reached, then the operation is finished. If the prescribed value A is judged to have not been reached, then the processing returns to the step S11, and the above-described operation is repeated. By the way, the possibility that charge will be removed from the trap film of the random noise generation element 10 is raised and the possibility of passing the test is raised by repeating the cycles of the set voltage steps a plurality of times. The prescribed value A can be set arbitrarily. Unless success is obtained in the test even if the operation is repeated a number of times of some degree, the possibility that a random number which passes the test will be obtained thereafter is judged to be considerably low and it is desirable to set the prescribed value A equal to approximately ten times. Unless a random number which passes the test can be generated even after the adjustment is conducted by the optimum voltage value adjustment circuit 20 a number of times of some degree, it is desirable to judge the random noise generation element 10 to be destroyed and take a measure of suspending the random number generation using the random noise generation element 10 or replacing the random noise generation element 10 with a reserve random noise generation element prepared beforehand.

According to the present embodiment, a random number of high quality having unpredictability and nonreproducibility as a physical random number regardless of the number of times of use and the frequency of use can be generated even if a random noise generation element utilizing the traps is used, because the random noise generation element is initialized periodically as heretofore described.

(Second Embodiment)

A random number generation apparatus according to a second embodiment will now be described.

Figure 12:
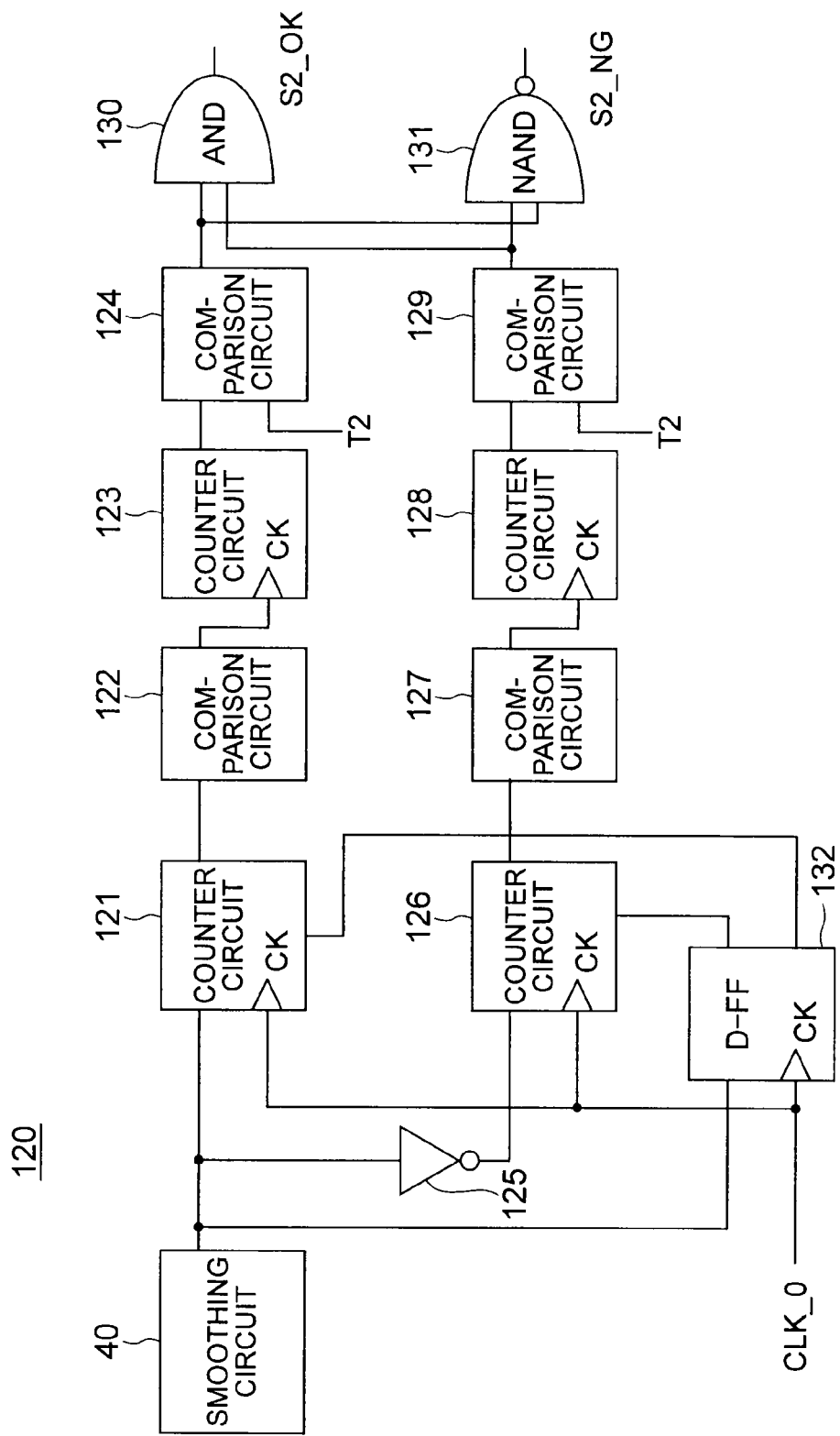
FIG. 12 is a circuit diagram showing a concrete example of a test circuit used in a second embodiment.

The random number generation apparatus according to the present embodiment has a configuration obtained by replacing the test circuit 50 shown in FIG. 6 included in the random number generation apparatus according to the first embodiment to conduct the monobit test with a test circuit 120 which conducts a long-run test shown in FIG. 12.

The test circuit 120 judges a random number sequence having a total number to fail when all random numbers in the random number sequence are "0" or "1." A configuration of its concrete example is shown in FIG. 12. The test circuit 120 in this concrete example includes a counter circuit 121, a comparison circuit 122, a counter circuit 123, a comparison circuit 124, a NOT circuit 125, a counter circuit 126, a comparison circuit 127, a counter circuit 128, a comparison circuit 129, an AND circuit 130, a NAND circuit 131 and a D flip-flop 132. This test circuit 120 is based upon the long-run test contained in items of the FIPS (Federal Information Processing Standard) 140-2.

Figure 13:
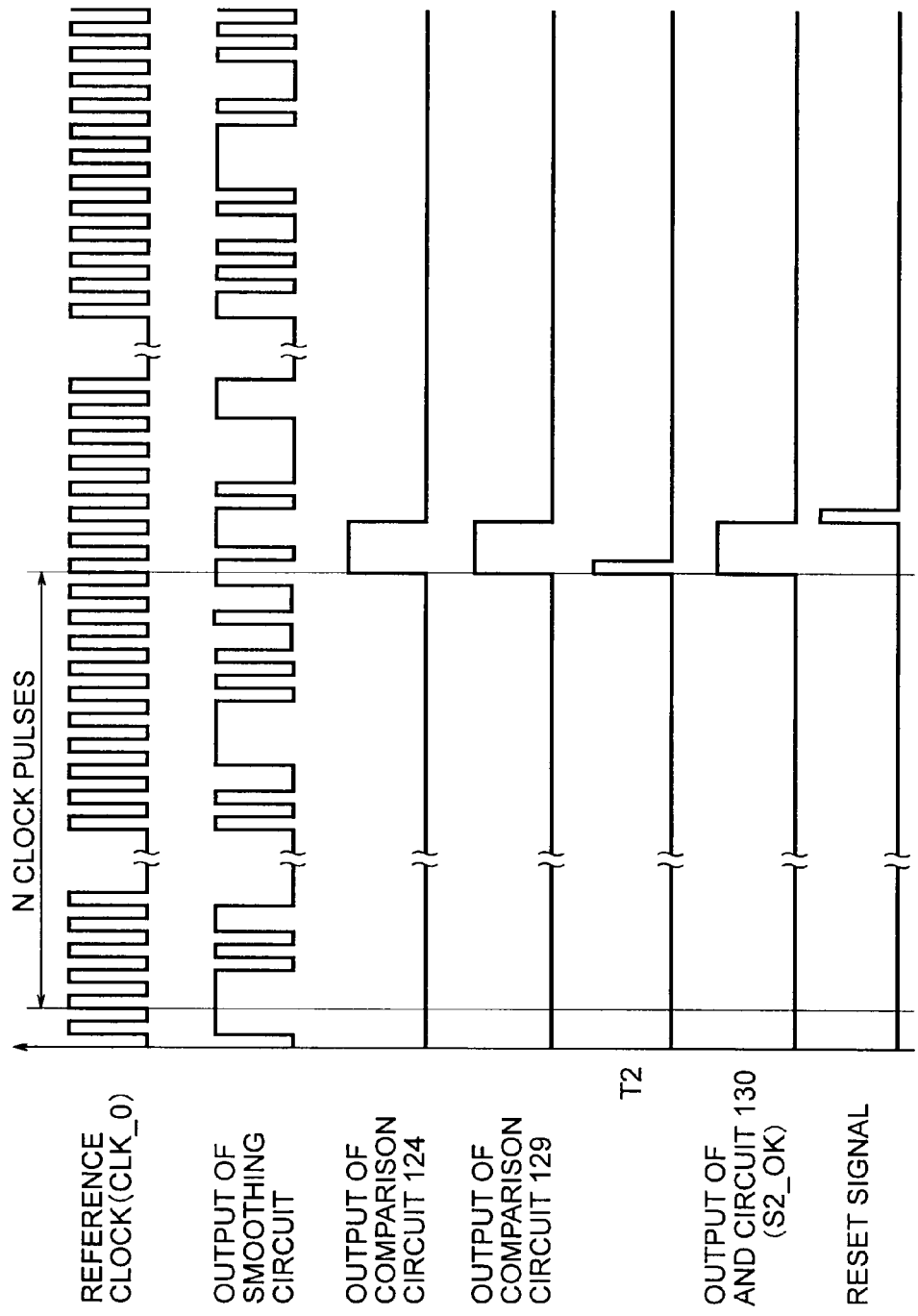
FIG. 13 is a waveform diagram for explaining operation of the test circuit shown in FIG. 12.

A waveform diagram for explaining operation of the test circuit is shown in FIG. 13. The long-run test is a test which judges the case where at least one set of random number sequences in which twenty-six "0"s or "1"s or more are output consecutively are included in a random number of 20,000 bits as failure.

The counter circuit 121 counts the number of consecutive "1"s in the random digital random number sequence output from the smoothing circuit 40. When the random number output from the smoothing circuit 40 has changed from "1" to "0", the counter circuit 121 is reset by a signal supplied from the flip-flop 132. The comparison circuit 122 reads a value counted by the counter circuit 121 immediately before it is reset. If the value is at least 26, then the comparison circuit 121 outputs "1". If the value is less than 26, then the comparison circuit 121 outputs "0". The counter circuit 123 counts the number of times "1" is output from the comparison circuit 122. The comparison circuit 124 reads a value in the counter circuit 123 at timing of a signal T2 which rises at the 20,000th bit since the test starts. If the value is 0, the comparison circuit 124 outputs "1". If the value is at least 1, the comparison circuit 124 outputs "0".

The NOT circuit 125 receives the output of the smoothing circuit 40 and inverts it. The inverted signal is sent to the counter circuit 126. The counter circuit 126 counts the number of consecutive "0"s in the random digital random number sequence output from the smoothing circuit 40. When the random number output from the smoothing circuit 40 has changed from "1" to "0", the counter circuit 126 is reset by a signal supplied from the flip-flop 132. The comparison circuit 127 reads a value counted by the counter circuit 126 immediately before it is reset. If the value is at least 26, then the comparison circuit 127 outputs "1". If the value is less than 26, then the comparison circuit 127 outputs "0". The counter circuit 128 counts the number of times "1" is output from the comparison circuit 127. The comparison circuit 129 reads a value in the counter circuit 128 at timing of a signal T2 which rises at the 20,000th bit since the test start. If the value is 0, the comparison circuit 129 outputs "1". If the value is at least 1, the comparison circuit 129 outputs "0".

The output of the comparison circuit 124 is a result of evaluation on the length of a random number sequence of "1" and the number of sets output from the smoothing circuit 40. The output of the comparison circuit 129 is a result of evaluation on the length of a random number sequence of "0" and the number of sets output from the smoothing circuit 40. If a suitable length of the random number sequence and a suitable number of sets of both "1" and "0" are included in 20,000 bits, therefore, an output of the AND circuit 130 becomes "1" and its output signal is output as the test success signal S2_OK. If either "1" or "0" does not satisfy the success condition, then the output of the AND circuit 130 becomes "0" and an output of the NAND circuit 131 becomes "1". The output of the NAND circuit 131 becomes the test failure signal S2_NG and that signal is sent to other circuits.

Although the random number generation apparatus according to the present embodiment is different in the test method from the random number generation apparatus according to the first embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the first embodiment.

(Third Embodiment)

A random number generation apparatus according to a third embodiment of the present invention will now be described.

Figure 14:
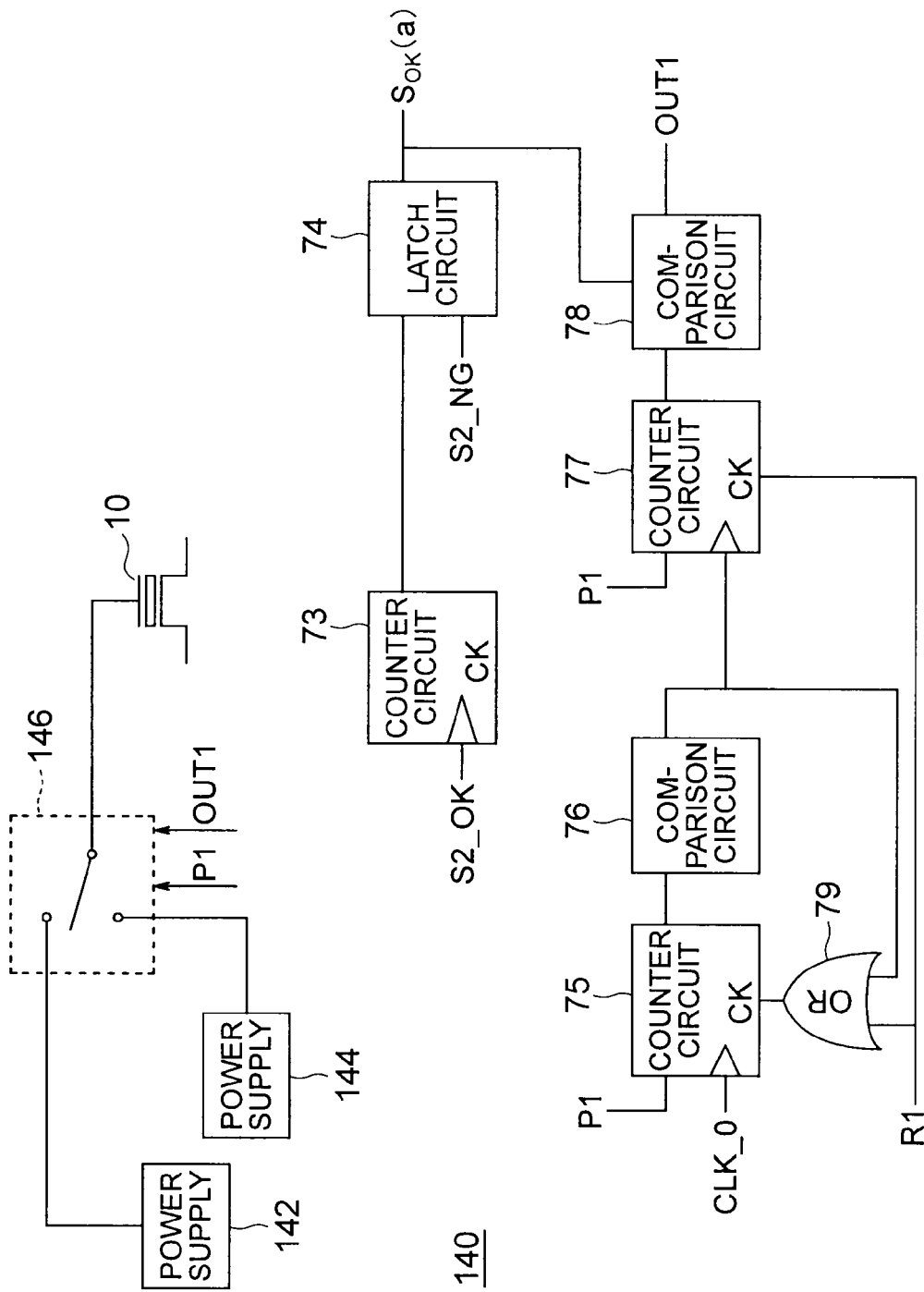
FIG. 14 is a circuit diagram showing a concrete example of an initialization circuit used in a third embodiment.
Figure 15:
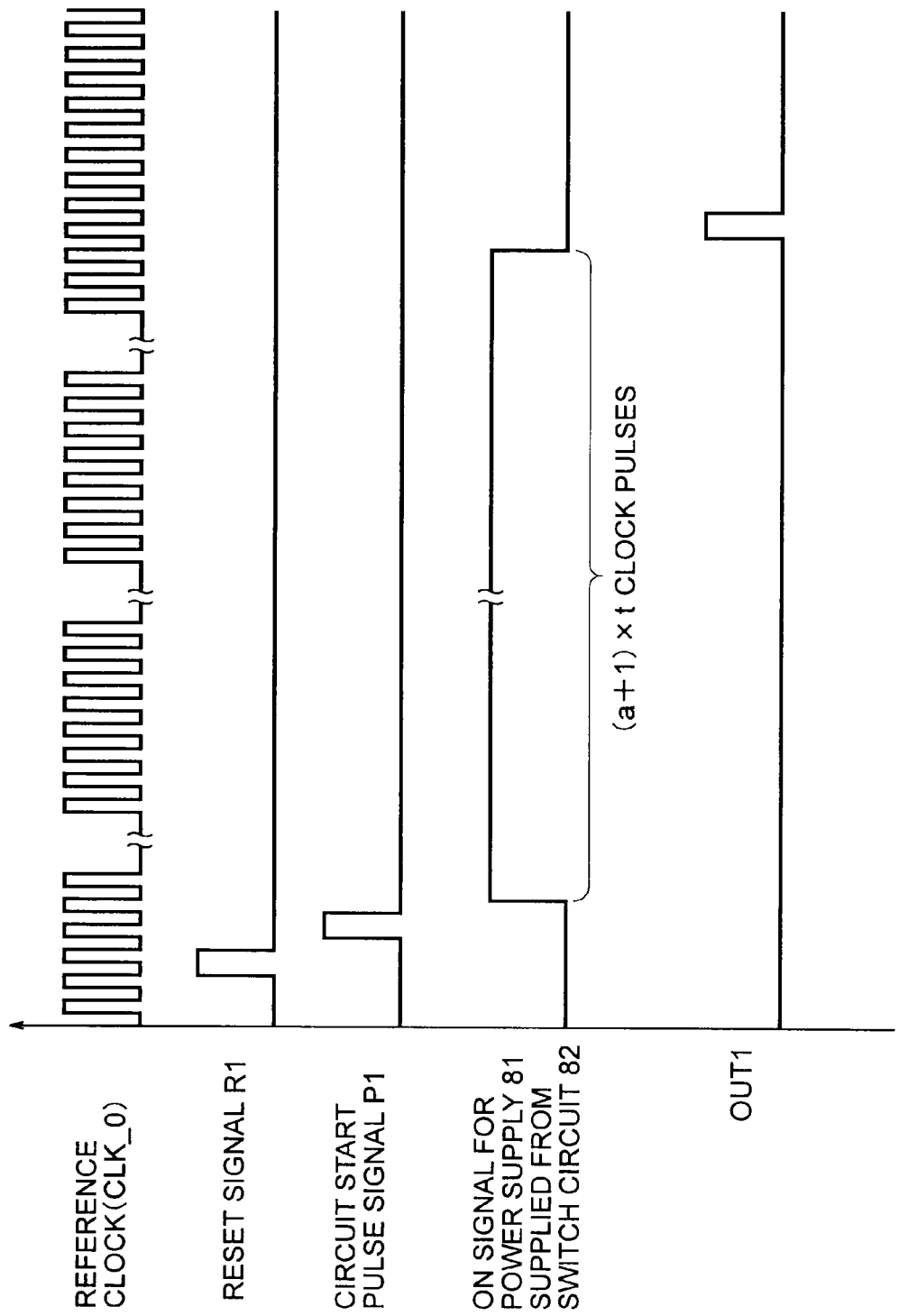
FIG. 15 is a waveform diagram for explaining operation of the initialization circuit shown in FIG. 14.

The random number generation apparatus according to the present embodiment has a configuration obtained by replacing the initialization circuit 70 shown in FIG. 8 and included in the random number generation apparatus according to the first embodiment with an initialization circuit 140 shown in FIG. 14. The initialization circuit 140 shown in FIG. 14 has a configuration obtained by replacing the power supply 71 and the switch circuit 72 included in the initialization circuit 70 shown in FIG. 8 with two power supplies 142 and 144 and a switch circuit 146. Unlike the first and second embodiments, the random number generation apparatus according to the present embodiment has a configuration in which a negative voltage is applied to the gate instead of applying the positive voltage to the substrate of the random noise generation element 10 at the time of initialization. A waveform diagram for explaining operation of the initialization circuit 140 is shown in FIG. 15.

The power supply 142 is a power supply which becomes the same in voltage as the output of the gate voltage supply circuit 21 included in the optimum voltage adjustment circuit 20 supplied to the gate of the random noise generation element 10 when acquiring the random number. The power supply 144 is a power supply for a voltage to be applied when initializing the random noise generation element 10. When the circuit is started, when the test circuit 50 has produced a result of failure, when a specific time is reached, and when a specific number of times of use is reached, the counter circuits 75 and 77 are reset by a reset signal R1 and a VDD signal of the counter circuits 75 and 77 is turned on by a circuit start pulse signal P1 output from the control circuit 100. After the reset signal R1 output from the control circuit 100 has turned on, connection in the switch circuit 146 is changed over from the power supply 142 to the power supply 144 by the circuit start pulse signal P1 in order to pull out charge which remains to be stored in the trap insulation film of the random noise generation element 10. As a result, a voltage which is opposite (negative) in sign to the voltage applied by the power supply 142 begins to be applied to the gate of the random noise generation element 10. As for the application time of the voltage, a time period corresponding to t clock pulses of the clock CLK_0 is regarded as one set. For refreshing at the time of the circuit start, the voltage is applied to the gate of the random noise generation element 10 over a time period corresponding to (t×1) clock pulses. In addition, application time corresponding to t clock pulses is added to the refresh time for each success in the check test. For example, if success is obtained "a" times and followed by a failure in the random number test conducted by the test circuit 50, then the voltage is applied over a time period corresponding to ((a+1)×t) clock pulses. The test success signal S2_OK is input to a clock input terminal of the counter 73. The counter 73 counts the number of times of success judged by the test circuit 50. The latch circuit 74 records the number at timing of reception of the test failure signal S2_NG. In addition, the reference clock signal CLK_0 is input to a clock input terminal CK of the counter circuit 75. When t clock pulses are counted, the comparison circuit 76 outputs a signal "1" and this signal is input to a clock input terminal of the counter circuit 77. The comparison circuit 78 records the number obtained by adding 1 to the number of successes in the test circuit 50 output from the latch circuit 74. When the output of the counter circuit 77 has become equal to the number, the comparison circuit 78 outputs a signal "1" as a signal OUT1. Upon receiving the output signal OUT1, the switch circuit 146 changes over the connection from the power supply 144 to the power supply 142.

Although the present embodiment is different in the initialization method from the first embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the first embodiment.

(Fourth Embodiment)

A random number generation apparatus according to a fourth embodiment will now be described.

The random number generation apparatus according to the present embodiment has a configuration obtained by replacing the initialization circuit 70 included in the random number generation apparatus according to the second embodiment with an initialization circuit 140 described with reference to the third embodiment and shown in FIG. 14.

Although the present embodiment is different in the initialization method from the second embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the second embodiment.

(Fifth Embodiment)

A random number generation apparatus according to a fifth embodiment of the present invention will now be described.

Figure 16:
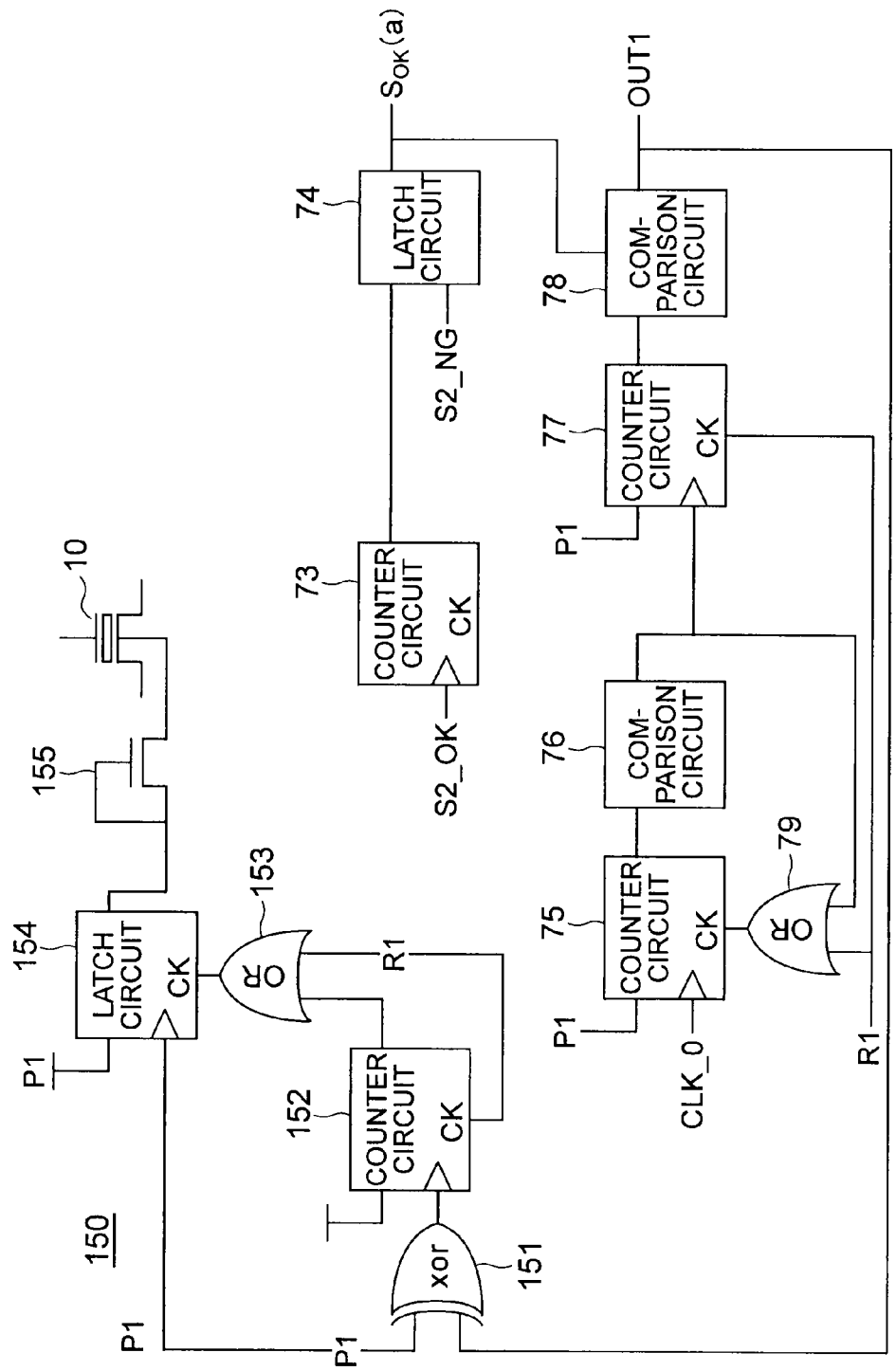
FIG. 16 is a circuit diagram showing a concrete example of an initialization circuit used in a fifth embodiment.
Figure 17:
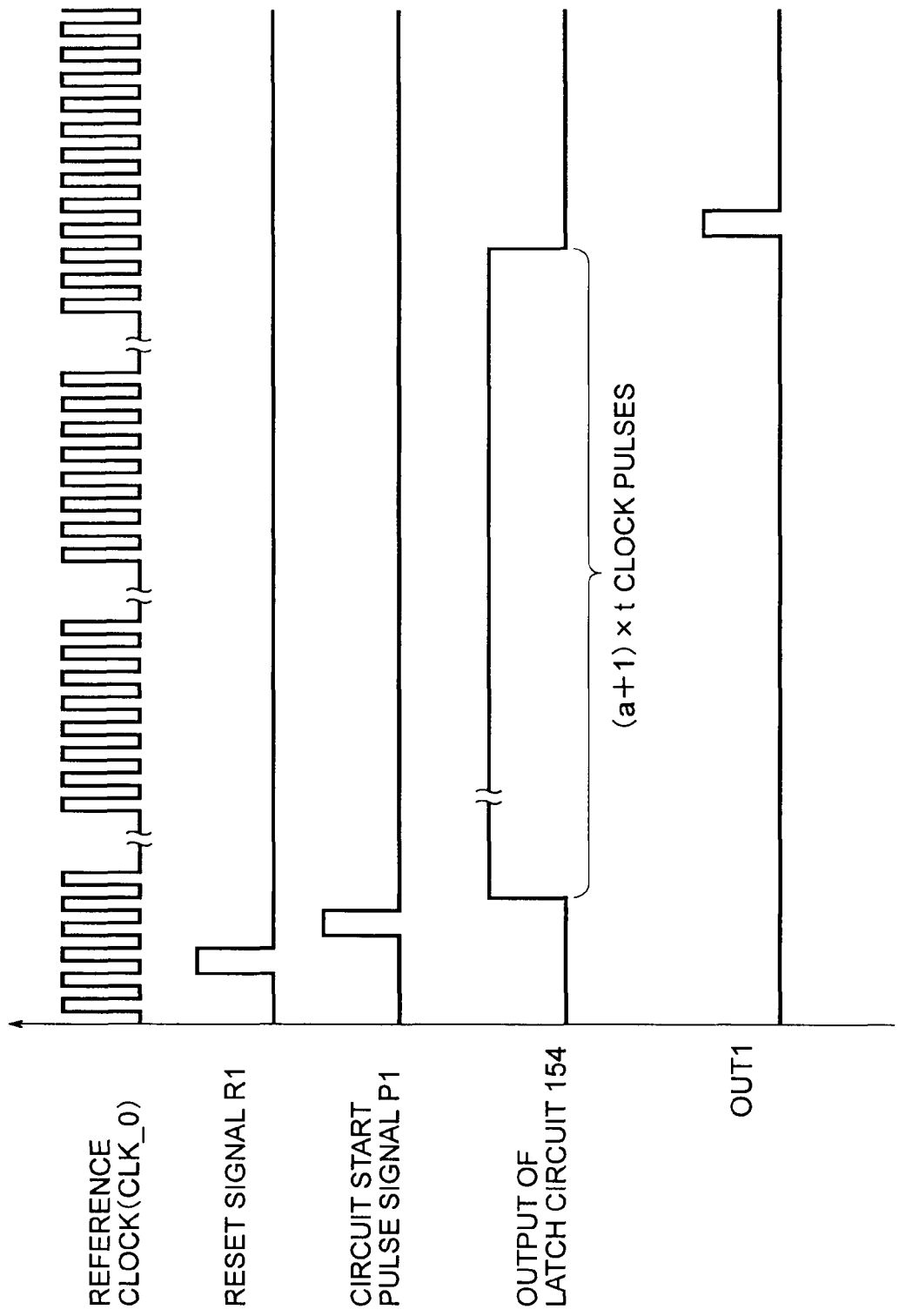
FIG. 17 is a waveform diagram for explaining operation of the initialization circuit shown in FIG. 16.
Figure 18:
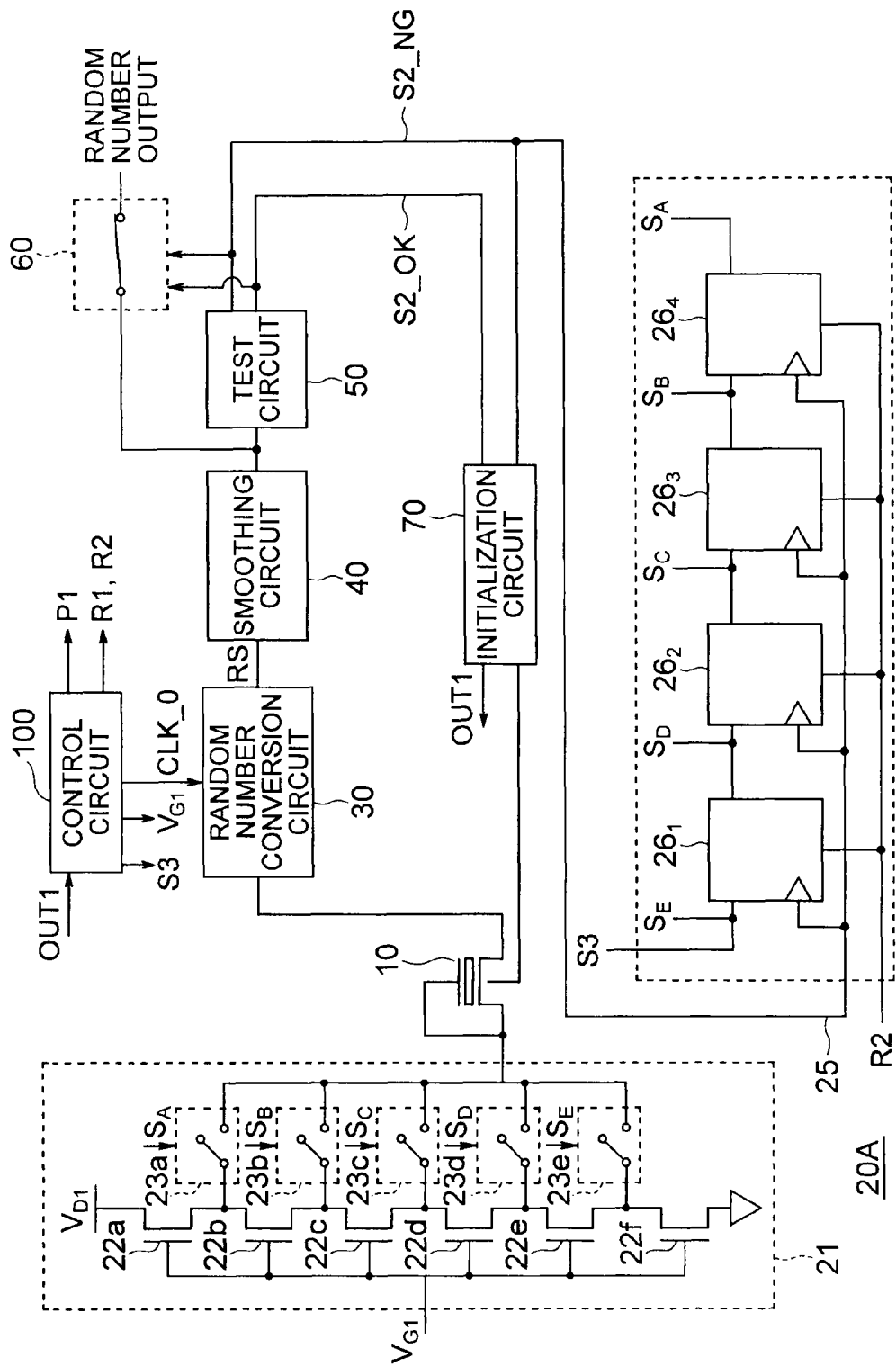
FIG. 18 is a block diagram showing a random number generation apparatus according to a seventh embodiment.

The random number generation apparatus according to the present embodiment has a configuration obtained by replacing the initialization circuit 70 included in the random number generation apparatus according to the first embodiment with an initialization circuit 150 shown in FIG. 16. The initialization circuit 150 shown in FIG. 16 has a configuration obtained by replacing the power supply 71 and the switch circuit 72 included in the initialization circuit 70 shown in FIG. 8 with an exclusive OR circuit (hereafter referred to as XOR circuit as well) 151, a counter circuit 152, an OR circuit 153, a latch circuit 154, and a resistor element 155 formed by diode-connecting a MOS transistor. A waveform diagram for explaining operation of the initialization circuit 150 is shown in FIG. 17.

When the circuit is started, when the test circuit 50 has produced a result of failure, when a specific time is reached, and when a specific number of times of use is reached, the initialization circuit 150 resets the counter circuits 75, 77 and 152 and the latch circuit 154 by a reset signal R1 and turns on a VDD signal of the counter circuits 75 and 77 and the latch circuit 154. After the reset signal R1 has turned on, the initialization circuit 150 inputs the circuit start pulse signal P1 to a clock input terminal of the latch circuit 154 and begins to apply a voltage to the substrate of the random noise generation element 10. As for the voltage application time, t clock pulses of the clock CLK_0 is regarded as one set. At the time of refresh when the circuit is started, the voltage is applied to the substrate of the random noise generation element 10 via the resistor element 155 over a time period corresponding to (t×1) clock pulses. In addition, application time corresponding to t clock pulses is added to the refresh time for each success in the test. For example, if success is obtained "a" times and followed by a failure in the random number test conducted by the test circuit 50, then the voltage is applied over a time period corresponding to ((a+1)×t) clock pulses. The test success signal S2_OK is input to a clock input terminal of the counter 73. The counter 73 counts the number of times of success judged by the test circuit 50. The latch circuit 74 records the number at timing of reception of the test failure signal S2_NG. In addition, the clock signal CLK_0 is input to a clock input terminal CK of the counter circuit 75. When the count value has become equal to t clock pulses, the comparison circuit 76 outputs a signal "1". This signal is input to a clock input terminal of the counter circuit 77. The comparison circuit 78 records the number obtained by adding 1 to the number of successes in the test circuit 50 output from the latch circuit 74. When the output of the counter circuit 77 has become equal to the number, the comparison circuit 78 outputs a signal "1" as a signal OUT1. The signal OUT1 output from the comparison circuit 78 is input to the XOR circuit 151. When the signal OUT1 has become "1", the second bit in the 2-bit counter 152 becomes "1", the latch circuit 154 is reset, and application of the voltage to the substrate of the random noise generation element 10 is stopped.

Although the present embodiment is different in the initialization method from the first embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the first embodiment.

(Sixth Embodiment)

A random number generation apparatus according to a sixth embodiment will now be described.

The random number generation apparatus according to the present embodiment has a configuration obtained by replacing the initialization circuit 70 included in the random number generation apparatus according to the second embodiment with an initialization circuit 150 described in the fifth embodiment.

Although the present embodiment is different in the initialization method from the second embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the second embodiment.

(Seventh Embodiment)

A random number generation apparatus according to a seventh embodiment will now be described.

The random number generation apparatus according to the present embodiment has a configuration obtained by replacing the optimum voltage adjustment circuit 20 included in the random number generation apparatus according to the first embodiment with an optimum voltage adjustment circuit 20A. The optimum voltage adjustment circuit 20A has the same configuration as that of the optimum voltage adjustment circuit 20. However, the optimum voltage adjustment circuit 20A is configured so as to apply the output of the gate voltage supply circuit 21 not only to the gate of the random noise generation element 10 but also to its drain. In other words, in the configuration according to the first to sixth embodiments, the drain voltage of the random noise generation element 10 is fixed and only the gate voltage is adjusted. In a configuration according to the present embodiment, however, the drain of the random noise generation element 10 is connected to its gate. Owing to this configuration, voltages applied to the drain and gate of the random noise generation element 10 become always equal to each other and the drain current is always in its saturated region. Therefore, fluctuation of the drain current becomes slightly small as compared in the linear region. However, it is considered that variation of the average value of the drain current is suppressed. Once the condition of the voltage applied to the random noise generation element 10 which is optimum to acquire a random number passing the test performed by the test circuit 120 is determined, thereafter the variation width of the average current of the drain current decreases and it becomes possible to decrease the number of times the optimum voltage adjustment circuit 20A is started.

Figure 19:
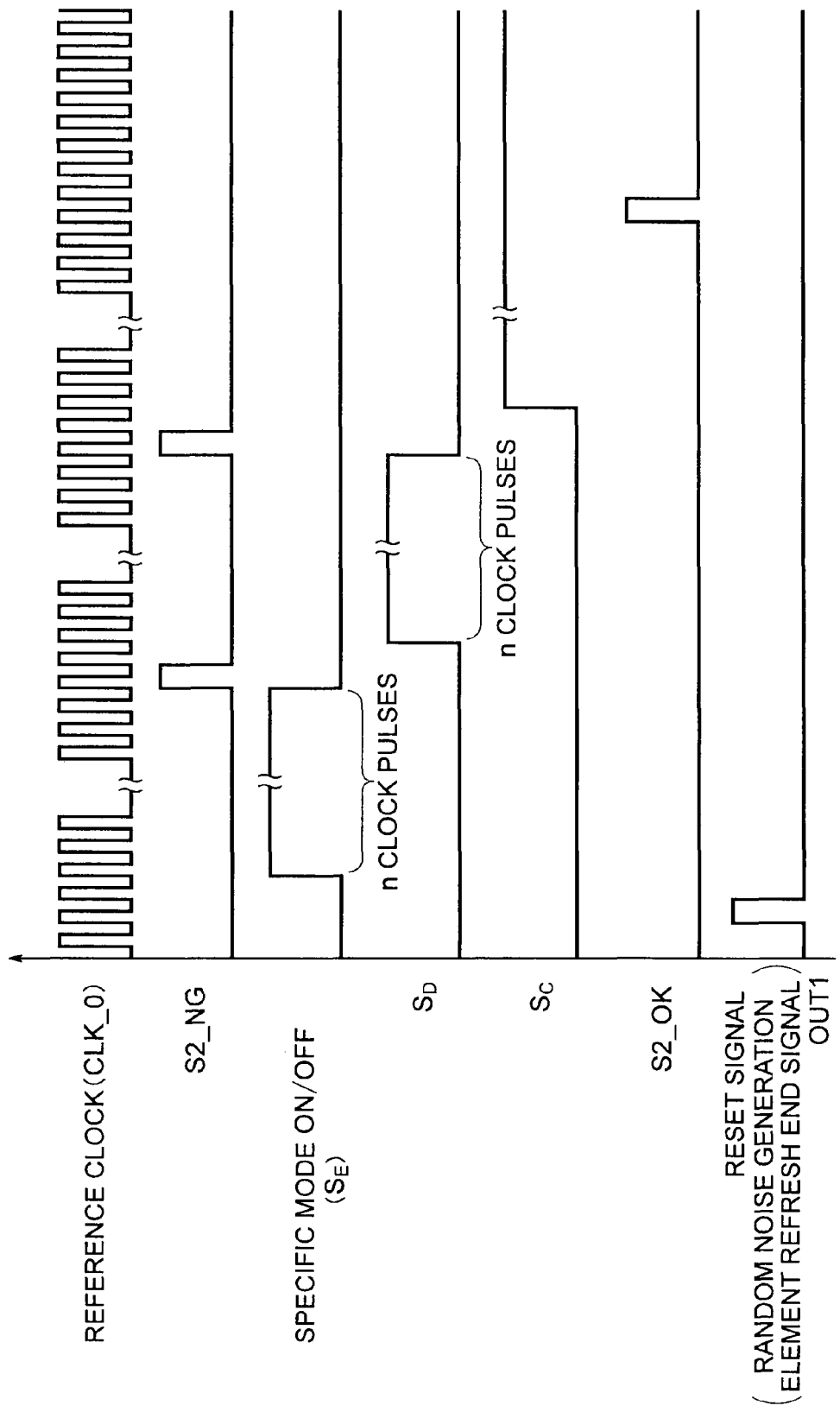
FIG. 19 is a waveform diagram for explaining operation of an optimum voltage adjustment circuit used in the seventh embodiment.

A waveform diagram for explaining operation of the optimum voltage adjustment circuit 20A in the present embodiment is shown in FIG. 19.

If the initialization end signal OUT1 of the random noise generation element 10 comes into the on-state, i.e., its value becomes "1", then the control signal S3 output from the control circuit 100 becomes "1" and the changeover signal $S_E$ turns on. As a result, the switch 23e turns on, and a potential at a common connection node between the MOS transistor 22e and the MOS transistor 22f is applied to the gate and drain of the random noise generation element 10. In a physical random number output from the random noise generation element 10 with the voltage at the common connection node being applied to the gate and drain of the random noise generation element 10, variation of the average value of the drain current is suppressed as described above. And the physical random number is converted to the digital random signal RS by the random number conversion circuit 30. The digital random signal output from the random number conversion circuit 30 is smoothed by the smoothing circuit 40, and the smoothed digital random signal is tested by the test circuit 50.

If a result of the test is success, then the switch 60 is turned on by the test success signal S2_OK and the digital random signal output from the smoothing circuit 40 is output to the outside as a random number. If a result of the test is failure, then the switch 60 is turned off by the test failure signal S2_NG and the digital random signal output from the smoothing circuit 40 is not output to the outside as a random number. In other words, if success continues in the random number test performed by the test circuit 120 periodically, the digital random signal output from the smoothing circuit 40 continues to be output to the outside as a random number.

If the test result is failure, then the test failure signal S2_NG is input to clock terminals of the shift register 25. As a result, the changeover signal shifts from the changeover signal $S_E$ to the changeover signal $S_D$, and the switch 23d turns on whereas other switches turn off. Accordingly, a voltage at the common connection node between the MOS transistor 22d and the MOS transistor 22e is applied to the gate of the random noise generation element 10. A physical random number output from the random noise generation element 10 in this state is converted to the digital random signal by the random number conversion circuit 30. In the same way as the operation performed when the switch 23e is in the on-state, the digital random signal output from the random number conversion circuit 30 is subject to the random number test in the test circuit 50 via the smoothing circuit 40. If the result is success, then the switch 60 is turned on. If the result is failure, then the test failure signal S2_NG is generated. And the above-described operation is repeated. As a result, the applied voltage adjustment operation in the shift register 25 and the gate voltage supply circuit 21 is continued until the random number passes the test. The applied voltage adjustment operation continues until the random number passes the test. If a result of the test is failure under all set voltage application conditions, then the random noise generation element 10 is initialized by the initialization circuit 70 again and the operation of the optimum voltage adjustment circuit 20A is performed from the first as described in the first embodiment. If failure continues in the test even if the initialization of the random noise generation element 10 and adjustment operation of the optimum voltage adjustment circuit 20A are repeated a certain number X of times, however, random number output in the random number generation apparatus is stopped. The number X of times for determining the stop is arbitrary. If a result of the test is failure even after this operation is repeated several tens times, however, then the possibility that a random number which passes the test can be acquired is judged to be considerably low thereafter and it is desirable to set the number of times of trial equal to at least approximately ten times.

Although the present embodiment is different in the test method from the first embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the first embodiment.

(Eighth Embodiment)

A random number generation apparatus according to an eighth embodiment will now be described.

The random number generation apparatus according to the present embodiment has a configuration obtained by replacing the test circuit 50 included in the random number generation apparatus according to the seventh embodiment with the test circuit 120 described in the second embodiment and shown in FIG. 12.

Although the present embodiment is different in the test method from the seventh embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the seventh embodiment.

(Ninth Embodiment)

A random number generation apparatus according to a ninth embodiment will now be described.

The random number generation apparatus according to the present embodiment has a configuration obtained by replacing the initialization circuit 70 included in the random number generation apparatus according to the seventh embodiment with the initialization circuit 140 described in the third embodiment and shown in FIG. 14.

Although the present embodiment is different in the initialization method from the seventh embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the seventh embodiment.

(Tenth Embodiment)

A random number generation apparatus according to a tenth embodiment will now be described.

The random number generation apparatus according to the present embodiment has a configuration obtained by replacing the test circuit 50 included in the random number generation apparatus according to the ninth embodiment with the test circuit 120 described in the second embodiment and shown in FIG. 12.

Although the present embodiment is different in the test method from the ninth embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the ninth embodiment.

(Eleventh Embodiment)

A random number generation apparatus according to an eleventh embodiment will now be described.

The random number generation apparatus according to the present embodiment has a configuration obtained by replacing the initialization circuit 70 included in the random number generation apparatus according to the seventh embodiment with the initialization circuit 150 described in the fifth embodiment and shown in FIG. 16.

Although the present embodiment is different in the initialization method from the seventh embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the seventh embodiment.

(Twelfth Embodiment)

A random number generation apparatus according to a twelfth embodiment will now be described.

The random number generation apparatus according to the present embodiment has a configuration obtained by replacing the test circuit 50 included in the random number generation apparatus according to the eleventh embodiment with the test circuit 120 described in the second embodiment and shown in FIG. 12.

Although the present embodiment is different in the test method from the eleventh embodiment, the random number generation apparatus according to the present embodiment can generate a random number of high quality having unpredictability and nonreproducibility as a physical random number regardless of the number of times of use and the frequency of use, because the random noise generation element is initialized periodically in the same way as the eleventh embodiment.

When a large number of traps are included in the trap insulation film, a phenomenon that the average current value of the drain current per unit time decreases with time although the drain current repeats random increase and decrease fast is observed as shown in FIG. 2. This phenomenon is construed to be caused as follows. Since a voltage continues to be applied for a long time, partial charges are stored in the trap insulation film 3 as they are although charges are charged and discharged between the channel region 1 and the trap insulation film 3. Regions where carrier electrons cannot intrude gradually increase in the trap insulation film 3 because of the Coulomb shielding effect caused by the trapped charges. As a result, the channel becomes high in resistance while leaving random changes.

As heretofore described, the random number generation apparatus according to the first to twelfth embodiments of the present invention includes an initialization circuit which causes charges stored in the trap film in the random noise generation element serving as a trap source to be emitted periodically and which initializes the random noise generation element. As a result, it is possible to obtain a random noise generation element having an output value which can be ensured to be always in a usable range. It is possible to lengthen the life of one random number source element and hold down the number of random noise generation elements provided in the random number generation apparatus to a minimum number. In addition, it becomes possible to confirm whether the random noise generation element is in a state that it can output a normal random number, by conducting tests periodically and monitoring the output random number. A random number generation apparatus capable of continuing to always ensure high security by having both the functions can be obtained.

(Outline of Thirteenth to Sixteenth Embodiments)

In the first to twelfth embodiments, the initialization circuit for restoring the trap insulation film in the random noise generation element 10 to the initial state by causing charges stored in the trap insulation film to be emitted periodically is provided. As shown in FIG. 2, however, the average drain current decreases exponentially and then becomes stable if the vicinity of 1,000 seconds is exceeded. In the thirteenth to sixteenth embodiments, a random number generation apparatus obtained by newly providing a drain current monitor circuit in the first embodiment in order to save up charges in traps in the trap insulation film and start the random number acquisition after the going in and out of charges to and from the traps reach equilibrium and a region where the drain current becomes stable is reached.

Figure 20:
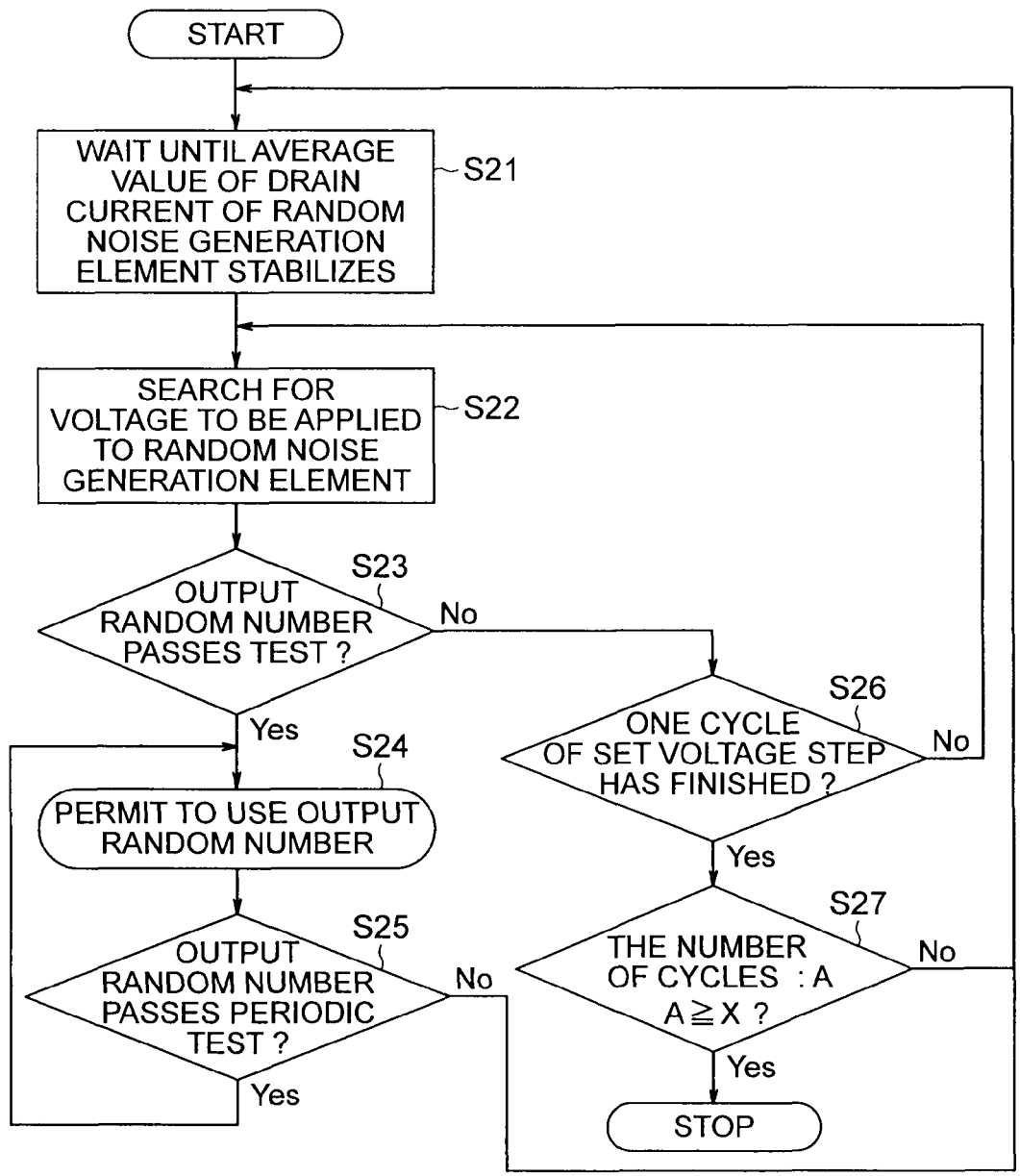
FIG. 20 is a flow chart for explaining outline of operation of a random number generation apparatus according to one of thirteenth to sixteenth embodiments.

First, outline of operation of a random number generation apparatus according to any of the thirteenth to sixteenth embodiments will be described with reference to FIG. 20.

First, the random number generation apparatus is started. The average value of the drain current output from the random noise generation element behaves exponentially as shown in FIG. 2. The average value of the drain current becomes nearly constant in the vicinity of the place where the going in and out of charges to and from the traps in the trap insulation film reach equilibrium (step S21). The change of the average value of the drain current is monitored by performing comparison with a current value near the drain current stepwise at definite time intervals. The random number generation apparatus waits until the average value of the drain current becomes nearly constant.

And adjustment is performed to obtain application voltage suitable for the input to the random noise generation element (step S22). It is now supposed that a drain current in the allowable range is acquired by making the drain voltage fixed and adjusting the gate voltage. As occasion demands, it is also possible to adjust both the drain voltage and the gate voltage.

A decision is made whether the drain current output from the random noise generation element is in the allowable range on the basis of whether a result of a probability statistical test performed on the output random number by the test circuit provided in a stage subsequent to the random number conversion circuit is success or failure (step S23). If the result of the test is success, then a value applied to the random noise generation element at the present time is judged to be an application condition which satisfies a criterion in random number output, and the random number output is started as it is (steps S24 and S25).

If a result of the test is failure, however, then the application voltage is changed and the test is performed on the change again (steps S26 and S22). If a result of the test is success, then this application condition is adopted. If the result of the test is failure, then the application condition value is changed again (steps S26 and S22). At the time of adjustment of the voltage application condition, it is desirable to confirm in the order from a low voltage to a high voltage.

Even after the voltage application condition is determined and the random number acquisition is started, the output random number is tested periodically to confirm whether there is no change in the quality of the random number (step S25). The frequency of conducting confirmation can be set arbitrarily. If a result of the periodic test of the random number is success, then acquisition of the random number is continued as it is. If the result of the periodic test of the random number is failure, then stabilization of the drain current of the random number source element is waited again and its value is monitored (step S21). If the average value of the drain current becomes nearly constant, then random number acquisition is performed under the application condition adopted until immediately before, and if a result of the test on the output random number is success, the random number acquisition is continued as it is. If the result of the test is failure, the application condition adjustment is performed from the beginning again. Subsequent operation becomes repetition of the above-described operation.

If failure continues in tests (steps S26 and S27) even though stabilization of the average drain current of the random noise generation element is waited a certain number X of times and the operation of the optimum voltage adjustment circuit (cycle of the set voltage steps) is repeated, the random number output in the random number generation apparatus is stopped. The number X of times for determining the stop is arbitrary. If a result of test does not become success even though the operation is repeated a number of times of some degree, the possibility that a random number which passes the test will be obtained thereafter is judged to be considerably low and it is desirable to set the number X of times of trial equal to at least approximately ten times. Unless a random number which passes the test can be generated even after the adjustment is performed by the optimum voltage value adjustment circuit 20 a number of times of some degree, it is desirable to judge the random noise generation element 10 to be destroyed and suspend the random number generation using the random noise generation element 10 or replace the random noise generation element with a reserve random noise generation element prepared beforehand.

(Thirteenth Embodiment)

A random number generation apparatus according to a thirteenth embodiment will now be described with reference to FIG. 21.

Figure 21:
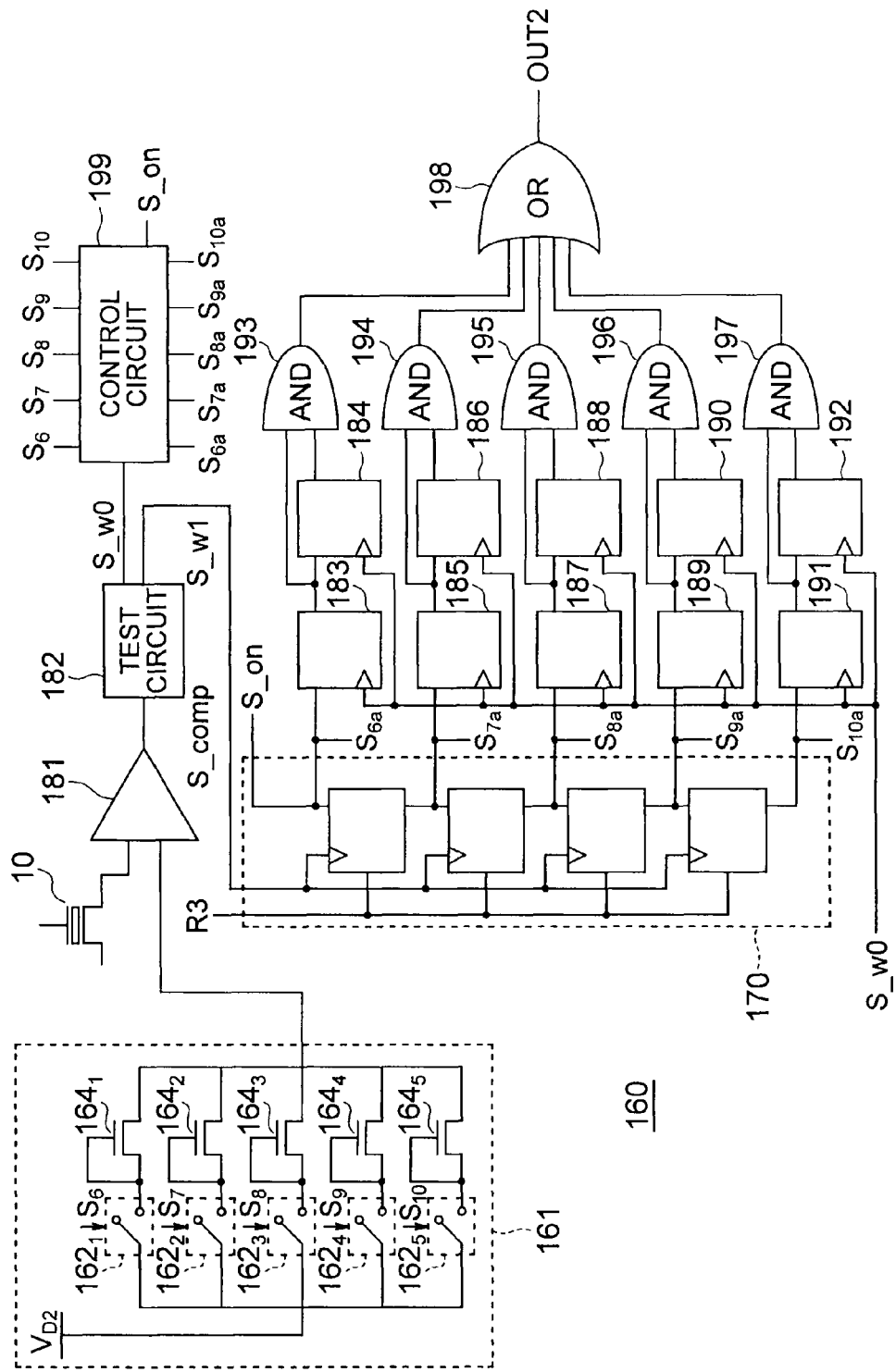
FIG. 21 is a block diagram showing a drain current monitor circuit.

The random number generation apparatus according to the present embodiment has a configuration obtained by newly providing a drain current monitor circuit 160 shown in FIG. 21 instead of the initialization circuit 70 in the random number generation apparatus according to the first embodiment shown in FIG. 3. The drain current monitor circuit 160 monitors the change of the average value of the drain current output from the random noise generation element 10, and checks the stability condition of the average value of the drain current. The drain current monitor circuit 160 includes a current supply circuit 161 formed of switches and MOSFETS serving as resistors, a shift register 170, a comparator 181, a simple test circuit 182, latch circuits 183 to 192, AND circuits 193 to 197, an OR circuit 198, and a control circuit 199.

The current supply circuit 161 includes five switches $162_1$ to $162_5$, and five MOS transistors $164_1$ to $164_5$. The switch $162_i$ (i=1, . . . , 5) and the MOS transistor $164_i$ are connected in series. A first end of each switch $162_i$ (i=1, . . . , 5) is connected to a drive power supply $V_{D2}$, and a second end of each switch $162_i$ is connected to the source and gate of the MOS transistor $164_i$. The switch $162_i$ conducts opening or closing operation on the basis of a changeover signal $S_{i+5}$ sent from the shift register 170. Drains of the MOS transistors $164_1$ to $164_5$ are connected to the comparator 181.

Operation of the drain current monitor circuit 160 will now be described with reference to FIGS. 22 to 24.

Figure 22:
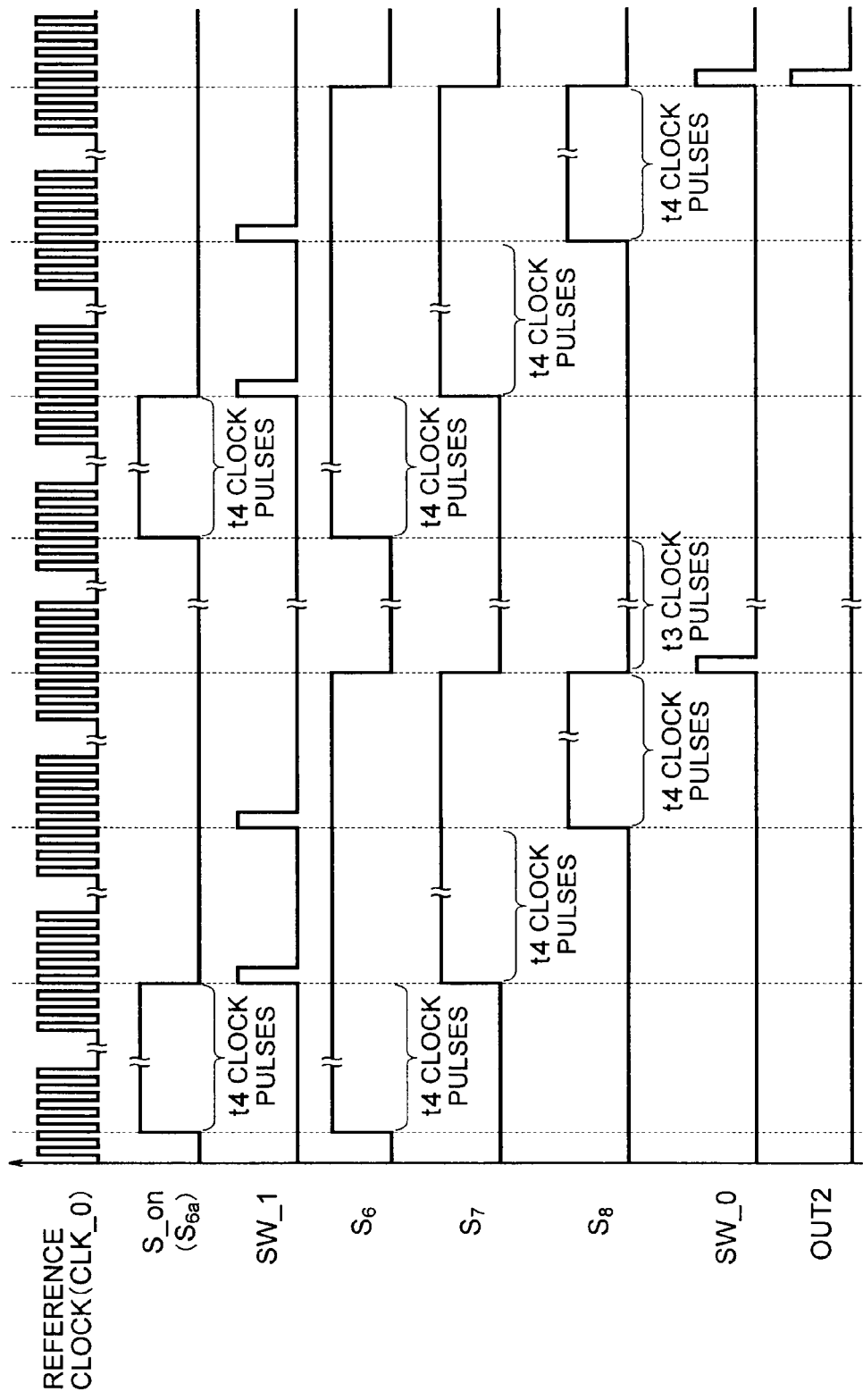
FIG. 22 is a waveform diagram for explaining operation of the drain current monitor circuit.
Figure 23:
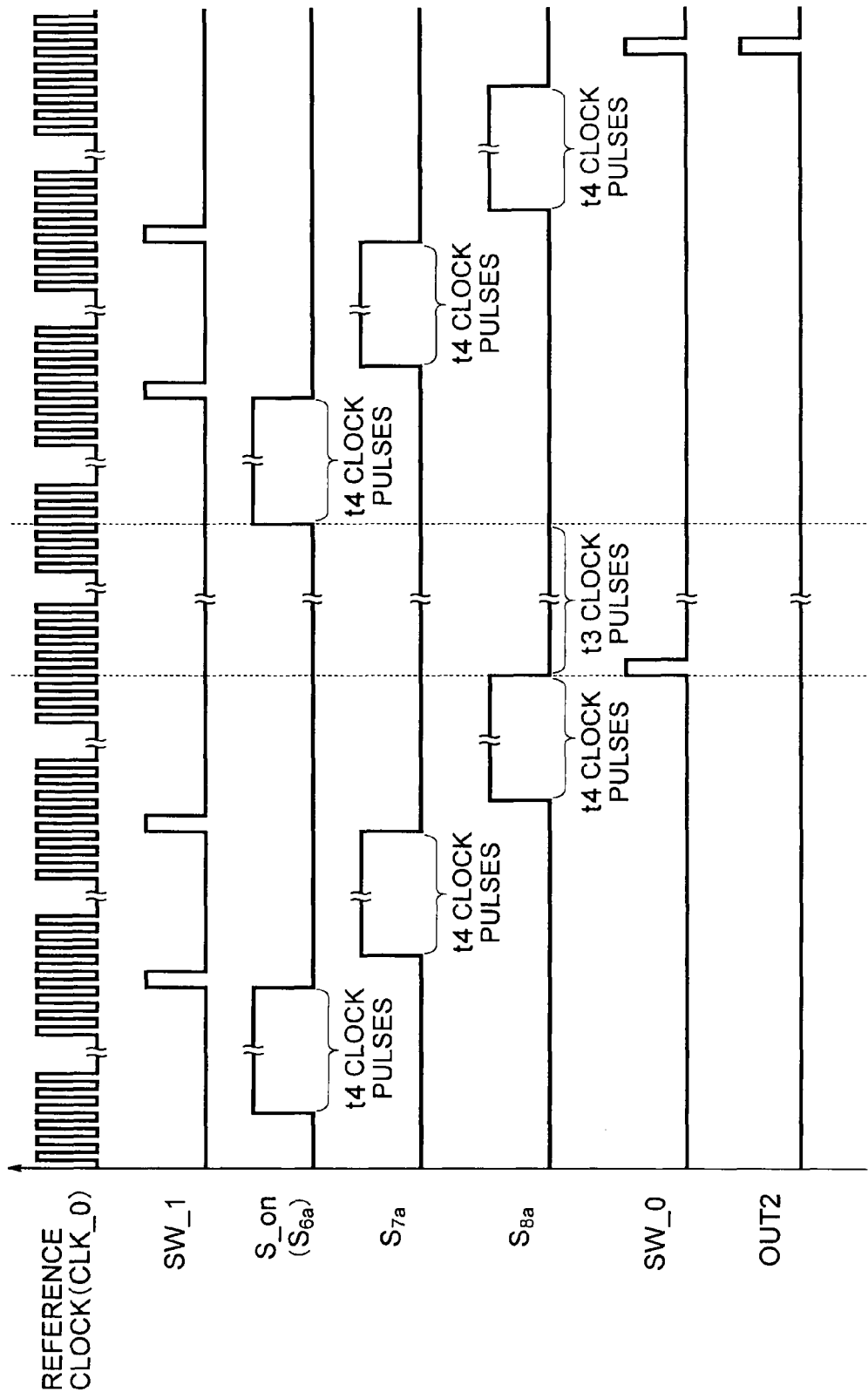
FIG. 23 is a waveform diagram for explaining operation of the drain current monitor circuit.

FIGS. 22 and 23 are waveform diagrams for explaining the operation of the drain current monitor circuit 160. First, a control signal S_on having a value of "1" is sent from the control circuit 199 to the shift register 170 to start the drain current monitor circuit 160. In the current supply circuit 161, the switch $162_1$ (i=1, . . . , 5) is turned on in order on the basis of the changeover signal $S_{i+5}$. Since the switch $162_i$ (i=1, . . . , 5) is turned on in order, the output of the current supply circuit 161 becomes greater stepwise. In other words, in the present embodiment, the current supply circuit 161 supplies currents $I_6, I_7, I_8, I_9$ and $I_{10}$ of five stages which become greater in the cited order.

The current $I_6$ is a current supplied when the switch $162_1$ has turned on. The current $I_7$ (>$I_6$) is a current supplied when the switch $162_1$ and $162_2$ have turned on. The current $I_8$ (>$I_7$) is a current supplied when the switch $162_1, 162_2$ and $162_3$ have turned on. The current $I_9$ (>$I_8$) is a current supplied when the switch $162_1, 162_2, 162_3$ and $162_4$ have turned on. The current $I_{10}$ (>$I_9$) is a current supplied when the switch $162_1, 162_2, 162_3, 162_4$ and $162_5$ have turned on. The maximum current $I_{10}$ of the current supply circuit 161 depends upon the combined resistance in the current supply circuit 161 and the drive voltage $V_{D2}$. Resistance values obtained from the MOS transistors $164_1$ to $164_5$, the drive voltage $V_{D2}$, and the gate voltage $V_{G2}$ are adjusted beforehand so as to make the current value $I_6$ in the first trial equal to the drain current of the random noise generation element 10 in the initial state. Here, the number of the switches $162_i$ (i=1, . . . , 5) and the number of shift stages in the shift register 170 determine the current level increment of the current to be compared with the drain current of the random noise generation element 10, and both numbers are arbitrary. As for the distribution of the current level for comparison, it is desirable for the comparison of the current value in the comparator 181 to set the maximum current equal to the current value of the drain current in the initial state and set the minimum current equal to a value which is slightly less than a drain current value obtained when a voltage is applied to the random noise generation element 10 for a long time.

Figure 24:
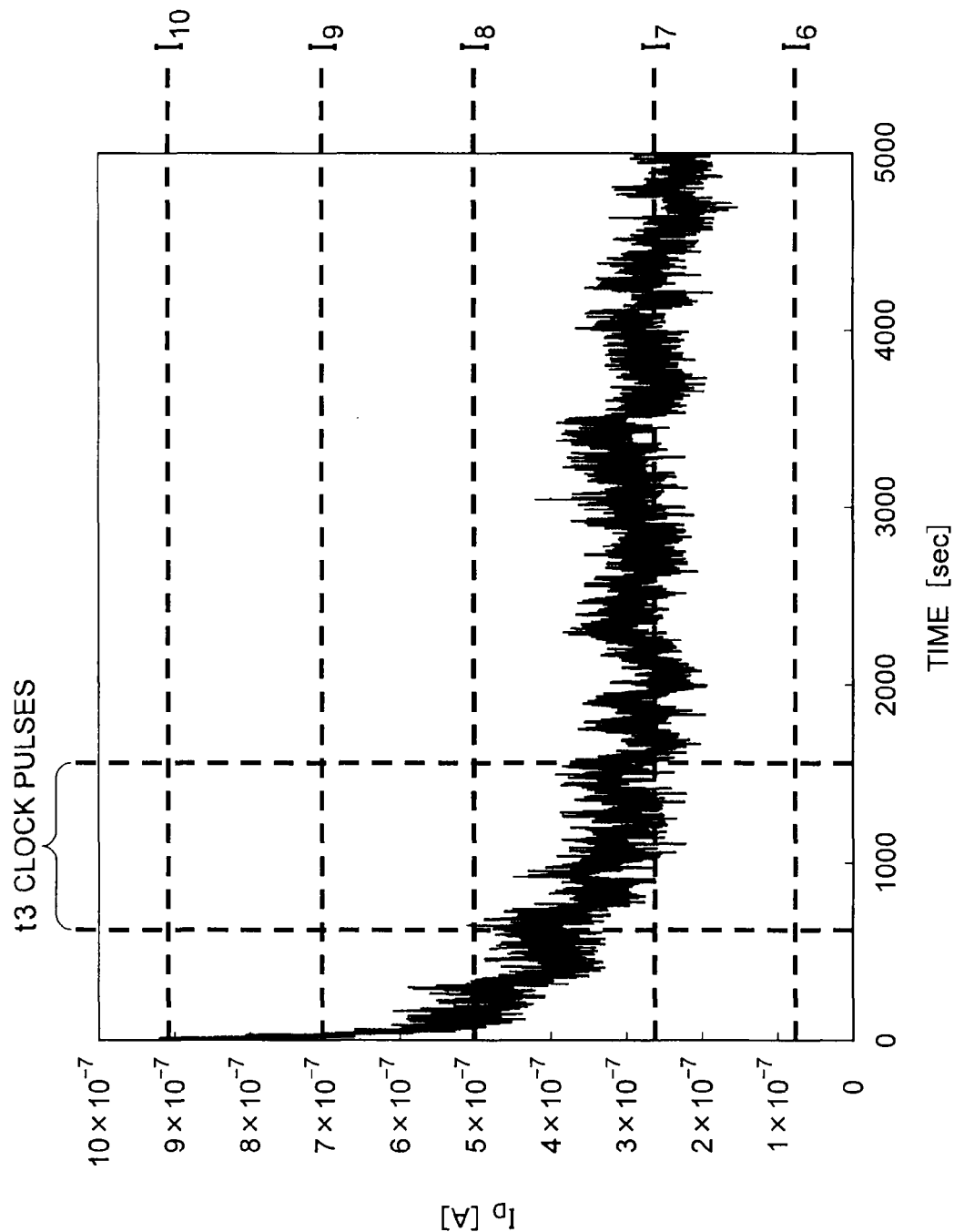
FIG. 24 is a diagram showing a change of a drain current of a random noise generation element with time.

FIG. 24 is a graph showing a change of the drain current of the random noise generation element 10 with time obtained by experiments, together with current values and time to be compared with in the operation of the drain current monitor circuit 160 according to the present embodiment. In the ensuing description, it is now supposed that the drain current of the random noise generation element 10 has stabilized between the current value $I_7$ supplied when the changeover signals $S_6$ and $S_7$ are in the on-state ("1") and the current value $I_8$ supplied when the changeover signals $S_6, S_7$ and $S_8$ are in the on-state.

The comparator 181 compares the current value output from the random noise generation element 10 with the output current of the current supply circuit 161 including the switches $162_1$ to $162_5$. The current output from the current supply circuit 161 is regarded as the reference current. A digital signal output from the comparator 181 is input to the simple test circuit 182. The simple test circuit 182 is simpler than the test circuit described in the embodiments and is different in purpose. The simple test circuit 182 aims at sensing whether the number of "1"s is more predominant (larger) than the number of "0"s in a random number sequence having a determined length and sending a result of the current value comparison in the comparator 181 to the shift register 170. The simple test circuit 182 will be described later.

The simple test circuit 182 which performs the above-described operation has, as its outputs, a signal S_W1 which assumes "1" when "1" is predominant in the output values of the comparator 181 and a signal S_W0 which assumes "1" when "0" is predominant. If the signal S_W0 is "1", then it is meant that the reference value is greater than the drain current. If the number of data "1" is larger than the number of data "0" when only the switch $162_1$ is in the on-state and a signal S_comp output from the comparator 181 is acquired at timing of the reference clock signal CLK_0, the output signal S_W1 from the simple test circuit 182 becomes "1". The signal S_W1 is input to clock input terminals of the shift register 170. At timing of the signal S_W1 becoming "1", the signal S_on ($S_{6a}$) is shifted to the signal $S_{7a}$. The switches $162_1$ to $162_5$ included in the current supply circuit 161 are in the on-state when the changeover signals $S_6$ to $S_{10}$ are in the on-state (state of "1"), respectively. Output signals $S_{6a}$ to $S_{10a}$ of the shift register 170 are sent to the flip-flops 183, 185, 187, 189 and 191, and sent to the control circuit 199 as well. If each of the signals $S_{6a}$ to $S_{10a}$ becomes "1", the control circuit 199 outputs the changeover signals $S_6$ to $S_{10}$ which retain the value until a reset signal R3 becomes "1" and sends the changeover signals to the switches $162_1$ to $162_5$.

When only the switch $162_1$ is in the on-state and the signal S_W1 has become "1", the switch $162_2$ is also turned on besides the switch $162_1$ by the current supply circuit 161 and the shift register 170. As for the subsequent operation, the comparator 181 compares the drain current of the random noise generation element 10 with the reference current and then the simple test circuit 182 conducts the test in the same way as that performed when the switch $162_1$ is in the on-state. In the description of the operation of the current monitor circuit 160, it is supposed that the drain current of the random noise generation element 10 stabilizes between the current value $I_7$ and the current value $I_8$ supplied from the current supply circuit 161. Therefore, the number of "1"s becomes large in the output signal S_comp of the comparator 181. In the test conducted by the simple test circuit 182, therefore, a result that the output signal S_W1 becomes "1" is obtained. If the signal S_W1 is input to clock input terminals of the shift register 170, then the signal $S_{8a}$ is output from the shift register 170. The control circuit 199 outputs the signal $S_8$ which continues to retain the signal $S_{8a}$ until the reset signal R3 is brought into the on-state ("1"), on the basis of the input signal $S_{8a}$ and turns on the switch $162_3$. At this time, three switches $162_1$, $162_2$ and $162_3$ are in the on-state in the current supply circuit 161. Therefore, the current $I_8$ form the current supply circuit 161 is supplied to the comparator 181. The comparator 181 compares the drain current of the random noise generation element 10 with the current $I_8$ serving as the reference current. Thereupon, "0" becomes predominant in the output value of the comparator 181 as shown in FIG. 24, and S_W0 in the output of the test circuit 182 becomes "1". Upon receiving this signal, the control circuit 199 continues applying the voltage to the random noise generation element 10 and temporarily interrupts the operation of the random number generation apparatus only for a time period corresponding to t3 clock pulses. If "0" becomes larger in the ratio between "1" and "0" in the output S_comp from the comparator 181 as a result of the simple test, then the signal S_W0 becomes "1". The control circuit 199 outputs the changeover signal S6 to turn on the switch $162_1$ again, t3 clock pulses after the signal S_W0 is brought into the on-state ("1"), and repeats the similar operation. If the test result changes from the result in which "1" is predominant to a result in which "0" is predominant for the first time when the same switch as that in the preceding routine (the switch $162_3$ in the present example) is turned on as a result of repeating the similar operation, then the latch circuits 183, 185, 187, 189 and 191 retain the signal S_W0 output this time whereas the latch circuits 184, 186, 188, 190 and 192 retain the result in a routine immediately preceding the routine at this time. Since S_W1 becomes "1" in consecutive routines at the time of the switch $162_3$ in the present example, an output of the AND circuit 195 becomes "1" and an output OUT2 of the OR circuit 198 also becomes "1". If the output OUT2 has become "1", the drain current of the random noise generation element 10 is regarded as stabilized, the operation of the drain current monitor circuit 160 is finished, and the operation of the optimum voltage adjustment circuit 20 is started.

(Simple Test Circuit)

Operation of the simple test circuit 182 will now be described. In the random number generation apparatus using the random noise generation element 10 which utilizes traps, a part of charges remains to be stored in the traps which serve as the generation source of the noise signal over a long time. Because of the screening effect, therefore, the drain current output from the random noise generation element 10 decreases exponentially as shown in FIG. 3. As appreciated from FIG. 3, however, the average value of the drain current stabilizes when some time has elapsed. If the random number acquisition is started after a wait until the average value of the drain current changes little with time and stabilizes, the random number can be acquired without refreshing (initializing) the random noise generation element 10.

As for the simple test circuit 182, a circuit which is simpler than the test circuit described earlier suffices. Here, the simple test circuit 182 is a circuit which detects only whether the number of "1"s is more predominant (larger than) the number of "0"s in a random number sequence having a determined length and returns a result of the detection.

Figure 25:
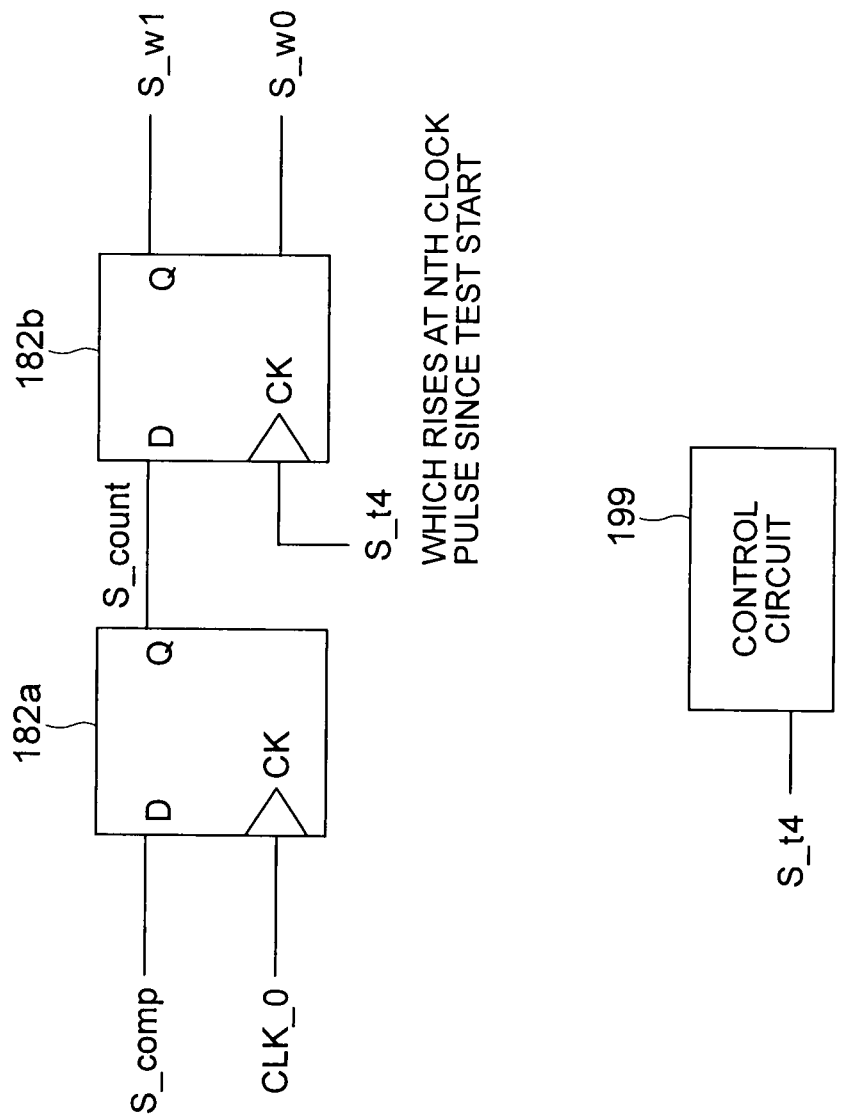
FIG. 25 is a circuit diagram showing a concrete example of a simple test circuit.
Figure 26:
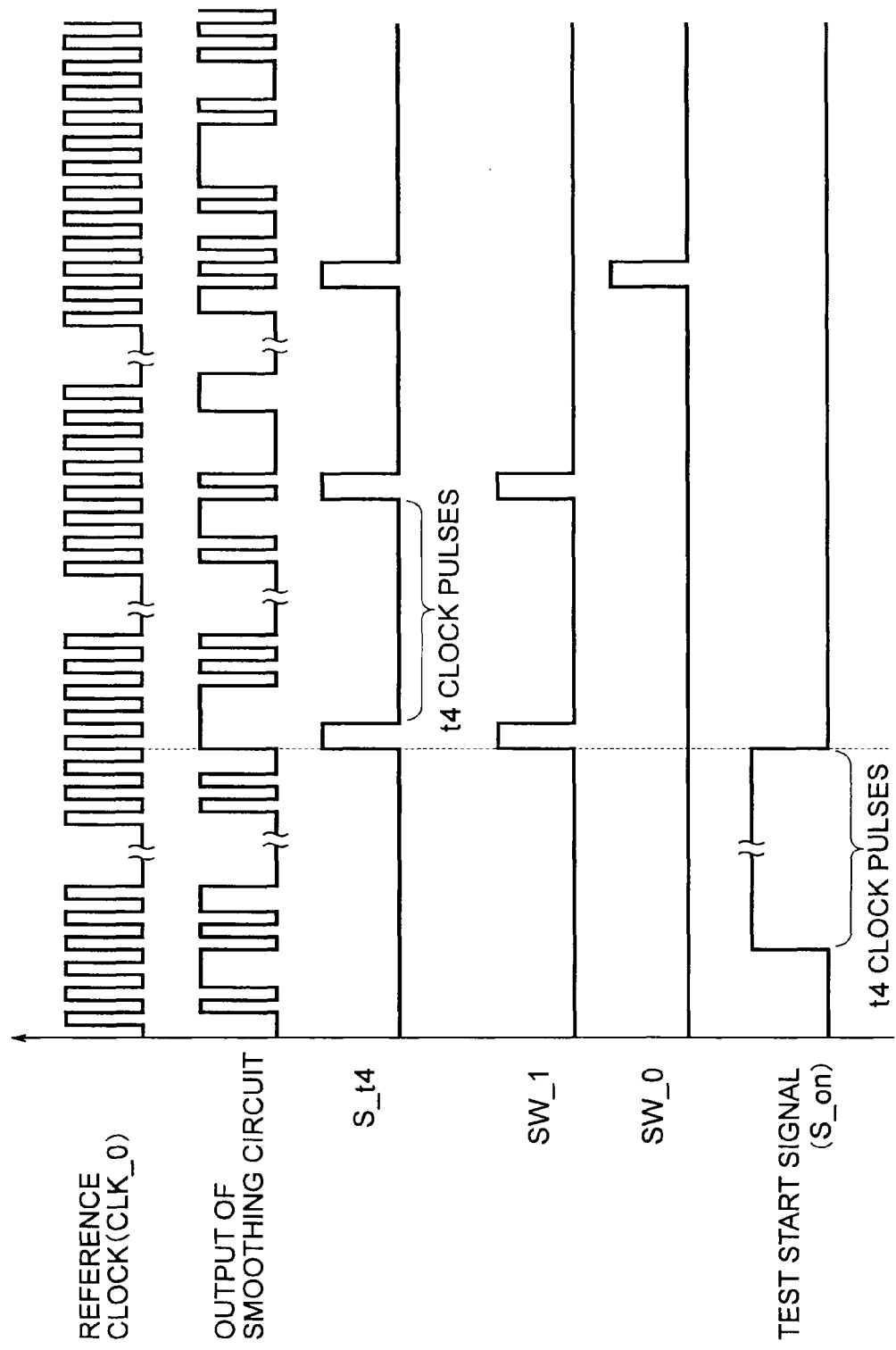
FIG. 26 is a waveform diagram for explaining operation of the simple test circuit.

FIG. 25 is a circuit diagram showing the simple test circuit 182 in the present embodiment. FIG. 26 is its timing chart.

The simple test circuit 182 in the present embodiment includes a counter circuit 182a and a comparison circuit 182b. A random number sequence, here the output signal S_comp of the comparator 181 in the drain current monitor circuit 160 is input to an input terminal D of the counter 182a, and the reference clock CLK_0 is input to a clock input terminal of the counter 182a. And its count value is input to an input terminal D of the comparison circuit 182b. A signal which rises t4 clock pulses after the count start is denoted by S_t4 and a count value in that section is denoted by S_count. If the greater part is "1" in the random number obtained during t4 clock pulses, then the output signal S_W1 of the comparison circuit 182b becomes "1". If the greater part is "0" in the random number obtained during t4 clock pulses, then the output signal S_W0 of the comparison circuit 182b becomes "1". Here, the length T4 of the random number sequence to be compared with, which is output from the control circuit 199 is arbitrary. As for the random number sequence required for the test, a random number sequence of 20,000 bits is needed, for example, in the test in FIPS 140-2. However, the simple test circuit 182 does not make a decision whether the random number property is good, but needs only to know the approximate magnitude of the drain current of the random noise generation element 10 at that time. Even if a random number sequence to be tested has a length which is approximately one tenth of 20,000 bits, therefore, a sufficient effect is obtained.

In the present embodiment, the output circuit 60 shown in FIG. 3 turns on and outputs the random number to the outside, when the drain current monitor circuit 160 detects that the drain current in the random noise generation element has stabilized and a result of the test conducted by the test circuit 50 is success.

According to the present embodiment, a random number of high quality having unpredictability and nonreproducibility as a physical random number regardless of the number of times of use and the frequency of use can be generated even if a random noise generation element utilizing the traps is used, because the drain current of the random noise generation element is monitored and the random number acquisition is started after the drain current has stabilized as heretofore described.

(Fourteenth Embodiment)

A random number generation apparatus according to a fourteenth embodiment will now be described. The random number generation apparatus according to the present embodiment has a configuration obtained from the random number generation apparatus according to the thirteenth embodiment by replacing the test circuit 50 described in the first embodiment with the test circuit 120 described in the second embodiment.

According to the present embodiment as well, a random number of high quality having unpredictability and nonreproducibility as a physical random number regardless of the number of times of use and the frequency of use can be generated even if a random noise generation element utilizing the traps is used, because the drain current of the random noise generation element is monitored and the random number acquisition is started after the drain current has stabilized in the same way as the thirteenth embodiment.

(Fifteenth Embodiment)

A random number generation apparatus according to a fifteenth embodiment will now be described. The random number generation apparatus according to the present embodiment has a configuration obtained from the random number generation apparatus according to the thirteenth embodiment by replacing the optimum voltage adjustment circuit 20 described in the first embodiment with the optimum voltage adjustment circuit 20A described in the seventh embodiment.

According to the present embodiment as well, a random number of high quality having unpredictability and nonreproducibility as a physical random number regardless of the number of times of use and the frequency of use can be generated even if a random noise generation element utilizing the traps is used, because the drain current of the random noise generation element is monitored and the random number acquisition is started after the drain current has stabilized in the same way as the thirteenth embodiment.

(Sixteenth Embodiment)

A random number generation apparatus according to a sixteenth embodiment will now be described. The random number generation apparatus according to the present embodiment has a configuration obtained from the random number generation apparatus according to the fifteenth embodiment by replacing the test circuit 50 described in the first embodiment with the test circuit 120 described in the second embodiment.

According to the present embodiment as well, a random number of high quality having unpredictability and nonreproducibility as a physical random number regardless of the number of times of use and the frequency of use can be generated even if a random noise generation element utilizing the traps is used, because the drain current of the random noise generation element is monitored and the random number acquisition is started after the drain current has stabilized in the same way as the fifteenth embodiment.

In the above-described embodiments, the test circuit 50 described in the first embodiment or the test circuit 120 described in the second embodiment is used as the test circuit. However, test methods other than the test method used in these test circuits can be used. For example, the run test or the poker test included in FIPS 140-2 is one of the test methods. In addition, a random number test circuit using auto-correlation as described in JP-A 2007-164434 (KOKAI) may be used as a test circuit which performs the random number test.

And it is desirable to conduct an entropy test or the like in order to indicate that the random number is a random number having high reliability. The adoption kind of the used test is arbitrary, and the reliability becomes higher by executing more tests.

As for the operation condition of the optimum voltage adjustment circuit, it is desirable to start the optimum voltage adjustment circuit without fail after the operation of the initialization circuit. And as for the test circuit, several test patterns are considerable. As for the output random number test, not only it is executed by hardware, but also a test program in software may be applied.

In the above-described embodiments, the example in which a MOSFET having a trap film of non-stoichiometric SiN is used as the random noise generation element has been described. A MOSFET having another trap (e.g., a MOSFET having a set of conductive Si fine particles formed on the tunnel insulating film as the random noise generation element (JP-A 2005-167165 (KOKAI)) also can be used. If an ordinary MOSFET is used instead of the MOSFET having a trap film of non-stoichiometric SiN, however, it can be applied as a method for adjusting the quantity of the RTS (Random telegraph signal).

The random noise generation element is a MOSFET having a thin trap film thickness. If the tunnel insulation film is made thick, then this MOSFET can be used as a memory cell of a NOMOS type memory which is used as a NAND flash memory and a memory having a floating gate formed of polysilicon.

According to the above-described embodiments of the present invention, a random number of high quality having unpredictability and nonreproducibility as a physical random number regardless of the number of times of use and the frequency of use can be generated even if a random noise generation element utilizing the traps is used, as heretofore described.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A random number generation apparatus comprising:
   a voltage supply circuit configured to supply a voltage;
   a random noise generation element comprising a transistor including a source region and a drain region formed apart from each other at a distance on a semiconductor substrate, a tunnel insulation film formed on the semiconductor substrate to serve as a channel region between the source region and the drain region, a gate electrode formed above the tunnel insulation film and supplied with the voltage from the voltage supply circuit, and a charge trap portion provided between the tunnel insulation film and the gate electrode, the charge trap portion being capable of trapping charges, and random noise being generated in a drain current flowing between the source region and the drain region on the basis of charges trapped in the charge trap portion;
   a random number conversion circuit configured to convert random noise generated from the random noise generation element to a random number and outputs the random number;
   a first test circuit configured to perform a random number test to test quality of the random number output from the random number conversion circuit; and
   a re-initialization circuit configured to pull out charges in the charge trap portion of the random noise generation element to the semiconductor substrate through the tunnel insulation film by applying a voltage to the semiconductor substrate and thereby initialize the charge trap portion, the re-initialization circuit carrying out initialization when a quality of the random number has degraded.

2. The apparatus according to claim 1, wherein the re-initialization circuit operates when a result of the random number test performed by the first test circuit is failure or when the number of successes in the results of the random number test performed by the first test circuit has reached a predetermined value.

3. The apparatus according to claim 1, wherein the re-initialization circuit pulls out charges in the charge trap portion applying a positive voltage to the semiconductor substrate.

4. A random number generation apparatus comprising:
a voltage supply circuit configured to supply a voltage;
a random noise generation element comprising a transistor including a source region and a drain region formed apart from each other at a distance on a semiconductor substrate, a tunnel insulation film formed on the semiconductor substrate to serve as a channel region between the source region and the drain region, a gate electrode formed above the tunnel insulation film and supplied with the voltage from the voltage supply circuit, and a charge trap portion provided between the tunnel insulation film and the gate electrode, the charge trap portion being capable of trapping charges, and random noise being generated in a drain current flowing between the source region and the drain region on the basis of charges trapped in the charge trap portion;
a random number conversion circuit configured to convert random noise generated from the random noise generation element to a random number and outputs the random number;
a first test circuit configured to perform a random number test to test quality of the random number output from the random number conversion circuit; and
a re-initialization circuit configured to pull out charges in the charge trap portion of the random noise generation element to the semiconductor substrate through the tunnel insulation film and thereby initialize the charge trap portion, wherein the re-initialization circuit pulls out charges in the charge trap portion by applying a negative voltage to the gate electrode, the re-initialization circuit carrying out initialization when a quality of the random number has degraded.

5. The apparatus according to claim 1, wherein the random number conversion circuit comprises a smoothing circuit to remove periodicity from the random noise.

6. The apparatus according to claim 1, wherein the voltage supply circuit is capable of generating different voltages.

7. The apparatus according to claim 1, wherein the voltage supply circuit applies a voltage to the drain region of the random noise generation element as well.

8. The apparatus according to claim 1, wherein the first test circuit conducts a monobit test.

9. The apparatus according to claim 1, wherein the first test circuit conducts a long-run test.

10. A random number generation apparatus comprising:
a voltage supply circuit configured to supply a voltage;
a random noise generation element comprising a source region and a drain region formed apart from each other at a distance on a semiconductor substrate, a tunnel insulation film formed on the semiconductor substrate to serve as a channel region between the source region and the drain region, a gate electrode formed above the tunnel insulation film and supplied with the voltage from the voltage supply circuit, and a charge trap portion provided between the tunnel insulation film and the gate electrode, the charge trap portion being capable of trapping charges, and random noise being generated in a drain current flowing between the source region and the drain region on the basis of charges trapped in the charge trap portion;
a random number conversion circuit configured to convert random noise generated from the random noise generation element to a random number and outputs the random number;
a first test circuit configured to perform a random number test to test quality of the random number output from the random number conversion circuit;
a drain current monitor circuit configured to monitor the drain current of the random noise generation element and make a decision whether the drain current has stabilized; and
an output circuit configured to output the random number output from the random number conversion circuit to outside when the drain current monitor circuit judges the drain current to have stabilized and the first test circuit judges the random number to be success.

11. The apparatus according to claim 10, wherein the current monitor circuit comprises:
a current supply circuit capable of supplying a plurality of different reference currents;
a comparator configured to compare one reference current included in the reference currents with the drain current of the random noise generation element, and outputs data "1" or data "0" on the basis of a result of the comparison;
a second test circuit configured to perform a test to determine whether the number of data "1" in a predetermined number of consecutive data output from the comparator is larger than the number of data "0"; and
a decision circuit configured to judge the drain current to have stabilized when a result of the test performed by the second test circuit has changed in changing the reference current supplied from the current supply circuit from a small reference current to a large reference current.

12. The apparatus according to claim 10, wherein the random number conversion circuit comprises a smoothing circuit to remove periodicity from the random noise.

13. The apparatus according to claim 10, wherein the voltage supply circuit is capable of generating different voltages.

14. The apparatus according to claim 10, wherein the voltage supply circuit applies a voltage to the drain region of the random noise generation element as well.

15. The apparatus according to claim 10, wherein the first test circuit conducts a monobit test.

16. The apparatus according to claim 10, wherein the first test circuit conducts a long-run test.

17. The apparatus according to claim 1, wherein the re-initialization circuit operates when the apparatus is started.

18. The apparatus according to claim 4, wherein the re-initialization circuit operates when the apparatus is started.

* * * * *